US008227565B2

(12) United States Patent
Wu et al.

(10) Patent No.: US 8,227,565 B2
(45) Date of Patent: *Jul. 24, 2012

(54) POLYURETHANE COMPOSITIONS FOR GOLF BALLS

(75) Inventors: Shenshen Wu, North Dartmouth, MA (US); Kelly J. Gasper, Lower Burrell, PA (US); Constantine A. Kondos, Pittsburgh, PA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,743

(22) Filed: Feb. 14, 2011

(65) Prior Publication Data

US 2011/0136974 A1    Jun. 9, 2011

Related U.S. Application Data

(60) Continuation of application No. 12/689,698, filed on Jan. 19, 2010, now Pat. No. 7,888,449, which is a continuation of application No. 11/429,055, filed on May 8, 2006, now Pat. No. 7,649,072, which is a division of application No. 10/339,603, filed on Jan. 10, 2003, now Pat. No. 7,041,769, which is a continuation-in-part of application No. 10/194,057, filed on Jul. 15, 2002, now Pat. No. 6,867,279, which is a continuation of application No. 09/466,434, filed on Dec. 17, 1999, now Pat. No. 6,476,176.

(51) Int. Cl.
*A63B 37/12* (2006.01)
*A63B 37/00* (2006.01)
*C08G 18/10* (2006.01)
*C08G 18/32* (2006.01)

(52) U.S. Cl. ............... 528/65; 528/61; 528/64; 528/85; 524/386; 524/765; 524/839; 524/875; 264/279; 264/279.1; 473/374; 473/378

(58) Field of Classification Search ............... None
See application file for complete search history.

(56) References Cited

U.S. PATENT DOCUMENTS

| | | | |
|---|---|---|---|
| 3,147,324 A | 9/1964 | Ward | 264/254 |
| 3,264,272 A | 8/1966 | Rees | 260/78.5 |
| 3,454,280 A | 7/1969 | Harrison et al. | 273/235 |
| 3,819,768 A | 6/1974 | Molitor | 260/897 B |
| 3,905,944 A | 9/1975 | Finelli | 260/75 NH |
| 3,940,145 A | 2/1976 | Gentiluomo | 273/218 |
| 4,123,061 A | 10/1978 | Dusbiber | 273/220 |
| 4,323,247 A | 4/1982 | Keches et al. | 273/235 R |
| 4,431,193 A | 2/1984 | Nesbitt | 273/235 R |
| 4,526,375 A | 7/1985 | Nakade | 273/235 R |
| 4,560,168 A | 12/1985 | Aoyama | 273/232 |
| 4,701,476 A | 10/1987 | Burchell et al. | 521/159 |
| 4,844,878 A | 7/1989 | Sullivan et al. | 273/235 R |
| 4,884,814 A | 12/1989 | Sullivan | 273/235 R |
| 4,911,451 A | 3/1990 | Sullivan et al. | 273/235 R |
| 4,925,193 A | 5/1990 | Melvin et al. | 273/232 |
| 4,956,438 A | 9/1990 | Ruetman et al. | 528/60 |
| 4,960,281 A | 10/1990 | Aoyama | 273/232 |
| 5,006,297 A | 4/1991 | Brown et al. | 264/234 |
| 5,066,762 A | 11/1991 | Ohkubo et al. | 528/85 |
| 5,071,578 A | 12/1991 | Ohkubo et al. | 252/62.54 |
| 5,248,878 A | 9/1993 | Ihara | 219/121.69 |
| 5,249,804 A | 10/1993 | Sanchez | 273/232 |
| 5,252,652 A | 10/1993 | Egashira et al. | 524/392 |
| 5,316,730 A | 5/1994 | Blake et al. | 422/73 |
| 5,334,673 A * | 8/1994 | Wu | 473/378 |
| 5,403,453 A | 4/1995 | Roth et al. | 204/164 |
| 5,456,972 A | 10/1995 | Roth et al. | 428/224 |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,605,968 A | 2/1997 | Egashira et al. | 525/221 |
| 5,661,207 A | 8/1997 | Carlson et al. | 524/414 |
| 5,688,191 A | 11/1997 | Cavallaro et al. | 473/373 |
| 5,688,595 A | 11/1997 | Yamagishi et al. | 428/375 |
| 5,692,974 A | 12/1997 | Wu et al. | 473/377 |
| 5,697,652 A | 12/1997 | Nishikawa | 285/314 |
| 5,697,856 A | 12/1997 | Moriyama et al. | 473/374 |
| 5,711,723 A | 1/1998 | Hiraoka et al. | 473/374 |
| 5,713,801 A | 2/1998 | Aoyama | 473/354 |
| 5,733,428 A | 3/1998 | Calabria et al. | 264/134 |
| 5,776,012 A | 7/1998 | Moriyama et al. | 473/372 |
| 5,779,561 A | 7/1998 | Sullivan et al. | 473/373 |

(Continued)

FOREIGN PATENT DOCUMENTS

WO    WO 96-40384    12/1996

(Continued)

OTHER PUBLICATIONS

Ashford; Ashford's Dictionary of Industrial Chemicals; 1992 pp. 147,397,921.*
Oertel, Polyurethane Handbook $2^{nd}$ Edition; 1993 p. 115.*
Lyondell Material Safety Data Sheet for propylene glycol, no date.*
Lyondell Material Safety Data Sheet for dipropylene glycol, no date.*
Final Office Action dated Aug. 1, 2011 of corresponding U.S. Appl. No. 12/191,897.
Ashford's dictionary of industrial Chemicals; 1999; pp. 147, 397,921.
U.S. Appl. No. 09/717,136, filed Nov. 22, 2000 entitled "Method of Making Golf Balls."
U.S. Appl. No. 09/442,845, filed Nov. 18, 1999 entitled "Mold for a Golf Ball" (Japanese Abstract submitted).
Lide, CRC Handbook of Chemistry and Physics $82^{nd}$ Edition; 2001; p. 3-273.

(Continued)

*Primary Examiner* — David Buttner
(74) *Attorney, Agent, or Firm* — Murphy & King, P.C.

(57) ABSTRACT

A method of forming golf balls with at least a portion formed from polyurethane and polyurea compositions employing a curative blend that includes a pigment, a curing agent, and a compatible freezing point depressing agent so that the curative blend has a lower freezing point than the curing agent by itself and the blend does not lose pigment dispersion upon solidification and subsequent thawing.

19 Claims, 5 Drawing Sheets

U.S. PATENT DOCUMENTS

| | | | |
|---|---|---|---|
| 5,779,563 A | 7/1998 | Yamagishi et al. | 473/354 |
| 5,792,008 A | 8/1998 | Kakiuchi et al. | 473/354 |
| 5,800,286 A | 9/1998 | Kakiuchi et al. | 473/365 |
| 5,803,831 A | 9/1998 | Sullivan et al. | 473/374 |
| 5,816,944 A | 10/1998 | Asakura et al. | 473/372 |
| 5,820,488 A | 10/1998 | Sullivan et al. | 473/374 |
| 5,820,491 A | 10/1998 | Hatch et al. | 473/378 |
| 5,849,168 A | 12/1998 | Lutz | 264/755 |
| 5,872,185 A | 2/1999 | Ichikawa et al. | 525/93 |
| 5,877,264 A | 3/1999 | Logothetis et al. | 526/86 |
| 5,885,172 A | 3/1999 | Hebert et al. | 473/354 |
| 5,908,358 A | 6/1999 | Wu | 473/378 |
| 5,908,699 A | 6/1999 | Kim | 428/408 |
| 5,919,100 A | 7/1999 | Boehm et al. | 473/354 |
| 5,919,101 A | 7/1999 | Yokota et al. | 473/354 |
| 5,929,171 A | 7/1999 | Sano et al. | 525/261 |
| 5,929,189 A | 7/1999 | Ichikawa et al. | 528/76 |
| 5,957,787 A | 9/1999 | Hwang | 473/379 |
| 5,965,669 A | 10/1999 | Cavallaro et al. | 525/221 |
| 5,977,264 A | 11/1999 | Ichikawq et al. | 525/329.9 |
| 5,981,654 A | 11/1999 | Rajagopalan | 525/66 |
| 5,981,658 A | 11/1999 | Rajagopalan et al. | 525/72 |
| 5,989,136 A | 11/1999 | Renard et al. | 473/376 |
| 5,993,968 A | 11/1999 | Umezawa et al. | 428/407 |
| 5,994,472 A | 11/1999 | Egashira et al. | 525/221 |
| 6,054,550 A | 4/2000 | Umezawa et al. | 528/76 |
| 6,056,842 A | 5/2000 | Dalton et al. | 156/243 |
| 6,075,223 A | 6/2000 | Harrison | 219/121.85 |
| 6,083,119 A | 7/2000 | Sullivan et al. | 473/354 |
| 6,099,415 A | 8/2000 | Lutz | 473/357 |
| 6,103,822 A | 8/2000 | Housel et al. | 524/840 |
| 6,117,024 A * | 9/2000 | Dewanjee | 473/351 |
| 6,120,392 A | 9/2000 | Kashiwagi et al. | 473/374 |
| 6,121,357 A | 9/2000 | Yokota | 524/406 |
| 6,126,558 A | 10/2000 | Higuchi et al. | 473/374 |
| 6,129,640 A | 10/2000 | Higuchi et al. | 473/374 |
| 6,129,881 A | 10/2000 | Puniello | 264/278 |
| 6,135,898 A | 10/2000 | Higuchi et al. | 473/374 |
| 6,149,535 A | 11/2000 | Bissonnette et al. | 473/354 |
| 6,150,462 A | 11/2000 | Rajagopalan et al. | 525/74 |
| 6,162,135 A | 12/2000 | Bulpett et al. | 473/373 |
| 6,174,247 B1 | 1/2001 | Higuchi et al. | 473/374 |
| 6,180,040 B1 | 1/2001 | Ladd et al. | 264/248 |
| 6,180,722 B1 | 1/2001 | Dalton et al. | 525/193 |
| 6,184,301 B1 | 2/2001 | Shindo et al. | 525/261 |
| 6,187,864 B1 | 2/2001 | Rajagopalan | 525/183 |
| 6,190,268 B1 | 2/2001 | Dewanjee | 437/370 |
| 6,207,784 B1 | 3/2001 | Rajagopalan | 528/71 |
| 6,210,292 B1 | 4/2001 | Higuchi et al. | 473/374 |
| 6,210,294 B1 | 4/2001 | Wu | 473/372 |
| 6,213,896 B1 | 4/2001 | Higuchi et al. | 473/374 |
| 6,213,898 B1 | 4/2001 | Ogg | 473/383 |
| 6,231,460 B1 | 5/2001 | Higuchi et al. | 473/374 |
| 6,235,230 B1 | 5/2001 | Puniello | 264/278 |
| 6,241,622 B1 | 6/2001 | Gobush et al. | 473/199 |
| 6,241,625 B1 | 6/2001 | Yokota et al. | 473/373 |
| 6,244,978 B1 | 6/2001 | Higuchi et al. | 473/374 |
| 6,248,028 B1 | 6/2001 | Higuchi et al. | 473/374 |
| 6,248,804 B1 | 6/2001 | Lutz | 523/160 |
| 6,267,692 B1 | 7/2001 | Higuchi et al. | 473/365 |
| 6,267,694 B1 | 7/2001 | Higuchi et al. | 473/374 |
| 6,286,364 B1 | 9/2001 | Aoyama et al. | 73/65.03 |
| 6,287,218 B1 | 9/2001 | Ohama | 473/377 |
| 6,290,614 B1 | 9/2001 | Kennedy et al. | 473/378 |
| 6,290,615 B1 | 9/2001 | Ogg | 473/378 |
| 6,291,592 B1 | 9/2001 | Bulpett et al. | 525/248 |
| 6,299,551 B1 | 10/2001 | Higuchi et al. | 473/374 |
| 6,309,313 B1 | 10/2001 | Peter | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,371,870 B1 | 4/2002 | Calabria et al. | 473/378 |
| 6,379,138 B1 | 4/2002 | Puniello et al. | 425/116 |
| 6,383,092 B1 | 5/2002 | Ogg | 473/378 |
| 6,386,992 B1 | 5/2002 | Harris et al. | 473/371 |
| 6,409,615 B1 | 6/2002 | McGuire et al. | 473/383 |
| 6,435,986 B1 | 8/2002 | Wu et al. | 473/378 |
| 6,458,895 B1 | 10/2002 | Wrigley et al. | 525/248 |
| 6,462,303 B1 | 10/2002 | Brown | 219/121.69 |
| 6,465,578 B1 | 10/2002 | Bissonnette et al. | 525/261 |
| 6,476,130 B1 | 11/2002 | Rajagopalan et al. | 525/74 |
| 6,476,176 B1 | 11/2002 | Wu | 528/76 |
| 6,488,591 B1 | 12/2002 | Gobush et al. | 473/199 |
| 6,500,073 B1 | 12/2002 | Gobush et al. | 473/199 |
| 6,500,495 B2 | 12/2002 | Lutz | 427/500 |
| 6,503,156 B1 | 1/2003 | Sullivan | 473/374 |
| 6,506,130 B2 | 1/2003 | Sullivan | 473/374 |
| 6,506,851 B2 | 1/2003 | Wu | 525/415 |
| 6,582,326 B2 | 6/2003 | Wu et al. | 473/378 |
| 6,610,812 B1 | 8/2003 | Wu et al. | 528/60 |
| 6,629,898 B2 | 10/2003 | Nardacci | 473/373 |
| 6,705,959 B2 | 3/2004 | Morgan et al. | 473/383 |
| 6,796,912 B2 | 9/2004 | Dalton et al. | 473/383 |
| 6,800,690 B2 | 10/2004 | Rajagopalan et al. | 525/183 |
| 6,835,794 B2 | 12/2004 | Wu et al. | 528/64 |
| 6,867,279 B2 | 3/2005 | Wu | 528/61 |
| 6,877,974 B2 | 4/2005 | Punielloi et al. | 425/116 |
| 6,913,547 B2 | 7/2005 | Cavallaro et al. | 473/371 |
| 6,935,240 B2 | 8/2005 | Gosetti | 101/491 |
| 6,958,379 B2 | 10/2005 | Wu et al. | 528/64 |
| 6,998,445 B2 | 2/2006 | Ladd et al. | 525/261 |
| 7,011,767 B2 * | 3/2006 | Gasper et al. | 252/182.24 |
| 7,041,769 B2 * | 5/2006 | Wu et al. | 528/61 |
| 7,186,777 B2 * | 3/2007 | Wu et al. | 524/765 |
| 7,202,303 B2 | 4/2007 | Wu et al. | 525/92 C |
| 7,211,624 B2 | 5/2007 | Wu et al. | 525/92 C |
| 7,214,738 B2 | 5/2007 | Wu et al. | 592/92 C |
| 7,217,764 B2 | 5/2007 | Wu et al. | 525/92 C |
| 7,427,243 B2 | 9/2008 | Sullivan | 473/378 |
| 7,491,787 B2 | 2/2009 | Wu et al. | 528/64 |
| 7,649,072 B2 * | 1/2010 | Wu et al. | 528/61 |
| 7,786,212 B2 * | 8/2010 | Wu et al. | 524/839 |
| 7,888,449 B2 * | 2/2011 | Wu et al. | 528/61 |
| 2001/0009310 A1 | 7/2001 | Hebert et al. | |
| 2001/0011045 A1 | 8/2001 | Takemura et al. | |
| 2001/0016522 A1 | 8/2001 | Watanabe et al. | |
| 2001/0018374 A1 | 8/2001 | Ichikawa et al. | |
| 2001/0018375 A1 | 8/2001 | Hayashi et al. | |
| 2001/0019971 A1 | 9/2001 | Hayashi et al. | |
| 2001/0028885 A1 | 10/2001 | Morck et al. | |
| 2001/0031669 A1 | 10/2001 | Ohama | |
| 2001/0031673 A1 | 10/2001 | Waranabe | |
| 2002/0025862 A1 | 2/2002 | Sullivan et al. | |
| 2002/0028885 A1 | 3/2002 | Sullivan et al. | |
| 2002/0082358 A1 | 6/2002 | Ohira et al. | |
| 2002/0160859 A1 | 10/2002 | Morgan et al. | |
| 2002/0160862 A1 | 10/2002 | Morgan et al. | |
| 2003/0078348 A1 | 1/2003 | Rajagopalan | |
| 2003/0032503 A1 | 2/2003 | Yokota | |
| 2003/0096936 A1 | 5/2003 | Wu et al. | |
| 2003/0106442 A1 | 6/2003 | Gosetti et al. | |
| 2003/0114255 A1 | 6/2003 | Dalton et al. | |
| 2003/0119989 A1 | 6/2003 | Ladd et al. | |
| 2003/0158001 A1 | 8/2003 | Morgan et al. | |
| 2003/0203771 A1 * | 10/2003 | Rosenberg et al. | 473/371 |
| 2003/0212240 A1 | 11/2003 | Wu et al. | |
| 2003/0224876 A1 | 12/2003 | Dewanjee | |
| 2003/0228937 A1 | 12/2003 | Dewanjee | |
| 2003/0232666 A1 | 12/2003 | Sullivan | |
| 2003/0236382 A1 | 12/2003 | Wu | |
| 2004/0072630 A1 | 4/2004 | Simonutti et al. | |
| 2004/0254298 A1 | 12/2004 | Kim et al. | |
| 2005/0009638 A1 | 1/2005 | Wu et al. | |
| 2005/0009642 A1 | 1/2005 | Wu et al. | |
| 2005/0202904 A1 | 9/2005 | Takesue et al. | |
| 2005/0028146 A1 | 10/2005 | Wu et al. | |
| 2005/0272529 A1 | 12/2005 | Wu | |
| 2006/0205913 A1 | 9/2006 | Wu et al. | |
| 2007/0117923 A1 | 11/2007 | Wu et al. | |

FOREIGN PATENT DOCUMENTS

| | | | |
|---|---|---|---|
| WO | WO 01/43832 | * | 6/2001 |
| WO | WO2008/150865 | | 12/2008 |

OTHER PUBLICATIONS

Dean, Lange's Handbook of Chemistry 15$^{th}$ Edition, 1999; p. 1.276.
Grant & Hackh's chemical Dictionary 5$^{th}$ Edition p. 118, Feb. 1990.

John A. Schey, Introduction to Manufacturing processes 410 (Anne Duffy, ed., McGraw-Hill 2d ed. 1987)(1977).
Non-Final Office Action dated Apr. 9, 2010 of corresponding U.S. Appl. No. 12/689,698.
Notice of Allowance dated Oct. 18, 2010 of corresponding U.S. Appl. No. 12/689,698.
Non-Final Office Action dated Jan. 2, 2009 of corresponding U.S. Appl. No. 11/429,055.
Notice of Allowance dated Sep. 8, 2009 of corresponding U.S. Appl. No. 11/429,055.
Non-Final Office Action dated Jul. 16, 2004 of corresponding U.S. Appl. No. 10/339,603.
Non-Final Office Action dated Jan. 28, 2005 of corresponding U.S. Appl. No. 10/339,603.
Notice of Allowance dated Oct. 13, 2005 of corresponding U.S. Appl. No. 10/339,603.
Non-Final Office Action dated Jan. 14, 2004 of corresponding U.S. Appl. No. 10/194,057.
Final Office Action dated Jul. 26, 2004 of corresponding U.S. Appl. No. 10/194,057.
Notice of Allowance dated Sep. 30, 2004 of corresponding U.S. Appl. No. 10/194,057.
Non-Final Office Action dated Jan. 18, 2008 of corresponding U.S. Appl. No. 11/256,055.
Final Office Action dated Sep. 18, 2008 of corresponding U.S. Appl. No. 11/256,055.
Non-Final Office Action dated Oct. 2, 2007 of corresponding U.S. Appl. No. 11/785,496.
Notice of Allowance dated Jun. 2, 2008 of corresponding U.S. Appl. No. 11/785,496.
Non-Final Office Action dated Nov. 2, 2010 of corresponding U.S. Appl. No. 12/850,335.
Final Office Action dated Mar. 22, 2011 of corresponding U.S. Appl. No. 12/850,335.
Non-Final Office Action dated Nov. 8, 2004 of corresponding U.S. Appl. No. 10/409,144.
Notice of Allowance dated May 12, 2005 of corresponding U.S. Appl. No. 10/409,144.
Non-Final Office Action dated Jan. 26, 2011 of corresponding U.S. Appl. No. 12/191,897.
Non-Final Office Action dated Sep. 15, 2009 of corresponding U.S. Appl. No. 12/371,387.
Final Office Action dated Mar. 23, 2010 of corresponding U.S. Appl. No. 12/371,387.
Non-Final Office Action dated Oct. 23, 2009 of corresponding U.S. Appl. No. 11/656,475.
Final Office Action dated Mar. 24, 2010 of corresponding U.S. Appl. No. 11/656,475.
Non-Final Office Action dated Jun. 22, 2006 of corresponding U.S. Appl. No. 10/900,468.
Notice of Allowance dated Jan. 5, 2007 of corresponding U.S. Appl. No. 10/900,468.
Non-Final Office Action dated Dec. 9, 2003 of corresponding U.S. Appl. No. 10/228,311.
Final Office Action dated Jun. 8, 2004 of corresponding U.S. Appl. No. 10/228,311.
Advisory Action dated Aug. 10, 2004 of corresponding U.S. Appl. No. 10/228,311.
Ashford; Ashford's Dictionary of Industrial Chemicals; 1995 pp. 147,397,921.
RubberMill Technical Data sheet for durometer hardness. No. date.

* cited by examiner

POLYURETHANE COMPOSITIONS FOR GOLF BALLS

CROSS-REFERENCE TO RELATED APPLICATIONS

This application is a continuation of U.S. patent application Ser. No. 12/689,698, filed Jan. 19, 2010, now U.S. Pat. No. 7,888,449, which is a continuation of U.S. patent application Ser. No. 11/429,055, filed May 8, 2006, now U.S. Pat. No. 7,649,072, which is a divisional of U.S. patent application Ser. No. 10/339,603, filed Jan. 10, 2003, now U.S. Pat. No. 7,041,769, which is a continuation-in-part of U.S. patent application Ser. No. 10/194,057, filed Jul. 15, 2002, now U.S. Pat. No. 6,867,279, which is a continuation-in-part of U.S. patent application Ser. No. 09/466,434, filed Dec. 17, 1999, now U.S. Pat. No. 6,476,176. The entire disclosures of these applications are incorporated by reference herein.

FIELD OF THE INVENTION

The invention relates to polyurethane and polyurea compositions for golf balls with improved pigment dispersion and stability of the curative blend. In particular, the present invention is directed to a curative blend that includes a curing agent and a freezing point depressing agent, wherein the curative blend has a lower freezing point than the curing agent by itself and the blend does not lose pigment dispersion upon solidification and subsequent thawing. The present invention also relates to polyurethane compositions and polyurea compositions formed from prepolymers of isocyanate and polyol or polyamine, of which the prepolymer is crosslinked with the improved curative blend of the invention. The invention also relates to golf ball components formed from the composition of the invention and the method of making the components.

BACKGROUND OF THE INVENTION

Golf balls are formed from a variety of compositions, which provides a golf ball manufacturer the ability to alter feel and aerodynamic characteristics of a particular ball. For example, golf ball covers formed from balata allow a highly skilled golfer to achieve spin rates sufficient to more precisely control ball direction and distance, particularly on shorter shots. Balata covered golf balls are easily damaged, however, which discourages the average golfer from using such balls. To remedy this durability issue, manufacturers typically use ionomer resin as a cover material. However, while ionomer resin covered golf balls possess virtually cut-proof covers, the spin and feel are inferior compared to balata covered balls.

Polyurethanes and polyureas have also been recognized as useful materials for golf ball covers since the resulting golf balls are durable like ionomer resin, but have the soft feel of a balata covered golf ball. U.S. Pat. No. 4,123,061 teaches a golf ball made from a polyurethane prepolymer formed of polyether with diisocyanate that is cured with either a polyol or an amine-type curing agent. In addition, U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol. U.S. Pat. No. 5,484,870 discloses a polyurea composition comprising the reaction product of an organic diisocyanate and an organic amine, each having at least two functional groups. Once these two ingredients are combined, the polyurea is formed and, thus, the ability to vary the physical properties of the composition is limited.

While polyurethane and polyurea covered golf balls are softer than ionomer resin covered golf balls, such balls do not fully match ionomer resin golf balls with respect to resilience or the rebound of the golf ball cover, which is a function of the initial velocity of a golf ball after impact with a golf club. Furthermore, because the polyurethanes and polyureas used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., Tinuvin 770, 765, and 328, are added to these aromatic polymeric materials. However, to further ensure that the covers formed from aromatic polyurethanes do not appear discolored, the covers are painted with white paint and then covered with a clear coat to maintain the white color of the golf ball. The application of a uniform white pigmented coat to the dimpled surface of the golf ball is a difficult process that adds time and costs to the manufacture of a golf ball.

In addition, the curing agents typically used in polyurethane compostions have relatively high freezing points, which make shipping and storage of these materials during the winter season problematic. This problem is compounded when the compositions include pigments. For example, when certain curatives have thawed from a frozen state, the solids separate and the quality of the pigment dispersed therein can be lost, as measured by the Hegman scale. The Hegman scale is a measurement of particle size, which is typically used to denote the degree of pigment dispersion. When a material completely loses its quality of dispersion (Hegman equals 0), the particle size of the material is generally about 100 microns or greater. For example, a curative that contains pigment, such as 1,4-butanediol, loses pigment dispersion quality upon freezing. To overcome this loss of pigment dispersion, the separated blend would need to be redispersed before being incorporated into various compositions. In cases where the pigment has undergone "hard settling," however, the pigment cannot be redispersed and the blend is rendered unusable.

There remains a continuing need for improved compositions that are easily processed into golf balls having performance characteristics, improved resilience, increased cut, scratch and abrasion resistance, enhanced adherence, and improved light stability. Thus, there also remains a need for improved curative blends, particularly those in which the pigment is dispersed, that are able to withstand lower temperature storage and shipping conditions. In addition, it would be advantageous to provide such agents that, even if frozen, are still able to be used without redispersing the pigment or without sacrificing properties of the resin. In particular, the addition of a freezing point depressing agent to a curative blend that results in a storage stable pigment dispersion would be advantageous to use in golf ball compositions.

SUMMARY OF THE INVENTION

The present invention is directed to improved curative blends for use in polyurethane and polyurea compositions that result in golf balls with improved durability, adherence, and light stability. One aspect of the present invention relates to a golf ball including a core and a cover, wherein the cover is formed from a composition including: a polyurethane prepolymer formed from the reaction product of an isocyanate and a polyol; and a curative blend formed from at least one curing agent and at least one compatible freezing point depressing agent.

In one embodiment, the at least one curing agent has a first freezing point and the curative blend has a second freezing point less than the first freezing point by about 5° F. or greater, preferably about 10° F. or greater, and more preferably about 15° F. or greater. In another embodiment, the freezing point depressing agent has a freezing point of about 10° F. or less, preferably about −10° F. to about −100° F.

The freezing point depressing agent may include hydroxy-terminated freezing point depressing agents selected from the group consisting of 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, and mixtures thereof. In one embodiment, the freezing point depressing agent is present in an amount of about 8 percent or greater by weight of the curative blend, preferably about 10 percent or greater by weight of the curative blend.

The curative blend preferably has a pigment dispersion of about 4 or greater on the Hegman scale. In one embodiment, the curative blend has a pigment dispersion of about 5 or greater on the Hegman scale.

The polyurethane prepolymer may be unsaturated or saturated, but when the prepolymer is saturated, the curative blend is also preferably saturated.

The present invention is also directed to a golf ball including a core and a light stable cover, wherein the cover is formed from a composition including: a polyurethane prepolymer formed from the reaction product of an isocyanate and a polyol; and a pigment dispersed in a curative blend including at least one curing agent and at least freezing point depressing agent. In one embodiment, the curative blend has a pigment dispersion of about 4 or greater after a freeze/thaw cycle. In another embodiment, the pigment is contained in a grind vehicle. The at least one curing agent has a first freezing point and the curative blend has a second freezing point, and wherein the second freezing point is preferably less than the first freezing point by about 10° F. or greater. In one embodiment, the freezing point depressing agent is present in an amount of about 10 percent or greater by weight of the curative blend.

The cover layer may be formed from casting, injection molding, or reaction injection molding and may have a thickness of about 0.02 inches to about 0.035 inches. In addition, the polyol included in the polyurethane prepolymer is preferably selected from the group consisting of saturated polyether polyols, saturated polycaprolactone polyols, saturated polyester polyols, saturated polycarbonate polyols, saturated hydrocarbon polyols, aliphatic polyols, and mixtures thereof. The at least one curing agent is preferably selected from the group consisting of ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy} cyclohexane; trimethylolpropane; polytetramethylene ether glycol; and mixtures thereof.

In one embodiment, the composition further includes at least one catalyst, at least one light stabilizer, at least one defoaming agent, at least one acid functionalized moiety, at least one fragrance component, or combinations thereof.

The present invention is also directed to a golf ball including a cover and a core, wherein at least one of the cover or the core includes a solvent-free pigment dispersion, wherein the pigment dispersion can be frozen, thawed, and used without redispersing the pigment. This pigment dispersion, which may also be referred to as a curative blend for the purposes of this invention, preferably includes at least one pigment and a blend of at least two active hydrogen-containing materials. In one embodiment, the at least two active hydrogen-containing materials have different freezing points. For example, the at least two active hydrogen-containing materials may comprise a first active hydrogen-containing material that has a higher freezing point than the freezing point of the second active hydrogen-containing material. In this aspect of the invention, the first active hydrogen-containing material may be a curing agent and the second active hydrogen-containing material may include 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, or mixtures thereof. The pigment dispersion of the curative blend preferably measures about 4.0 or greater on the Hegman scale.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
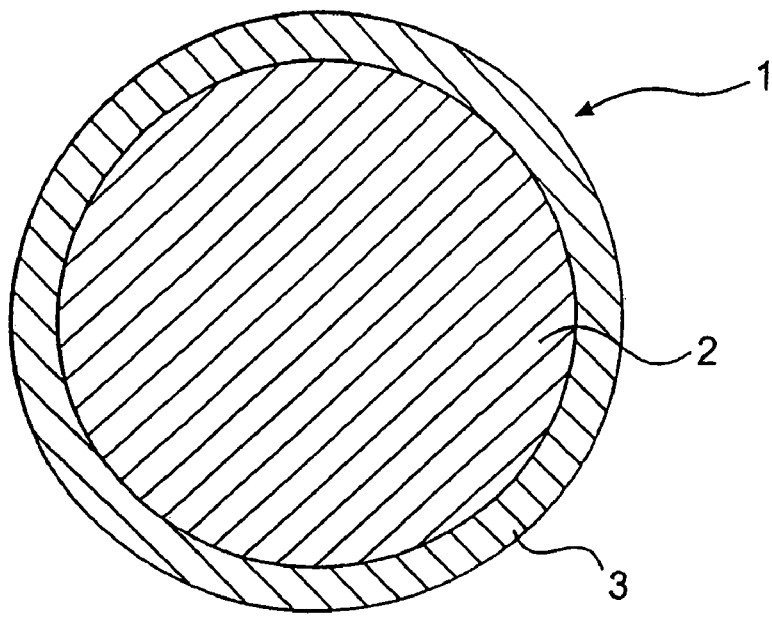
FIG. 1 is a cross-sectional view of a two-piece golf ball, wherein the cover is formed from the polyurethane or polyurea compositions of the invention.

The present invention contemplates improved polyurethane- and polyurea-based compositions for use in various golf ball components. The compositions of the invention may be included in a variety of golf ball constructions, i.e., one-piece, two-piece, or multilayer balls. In addition, the compositions of the invention are also intended for use in golf club components, e.g., club head inserts.

In particular, the curative blend used in the compositions of the invention are modified with a freezing point depressing agent so that the freezing point of the blend is less than the freezing point of the curing agent by itself and so that any pigment dispersed within the blend stays dispersed under a host of storage and shipping conditions. Thus, this modified curative blend results in a storage stable pigment dispersion. As used herein, the term "storage stable" refers to the ability of a dispersion, blend, composition, or the like, to resist freezing at room temperature (about 68° F. to about 77° F.) and below (down to about −15° F.), as well as the ability of the dispersion, blend, composition, or the like to retain their beneficial properties, such as adhesive strength, shear/cut resistance, hardness, and durability, even if frozen. For example, the modified curative blends of the present invention maintain pigment dispersion quality when frozen and also after a freeze/thaw cycle.

The inclusion of the modified curative blends in polyurethane or polyurea compositions, which are incorporated into various golf components, e.g., covers, result in golf balls with physical and aerodynamic properties better than or equal to golf balls incorporating polyurethane or polyurea compositions without modified curative blends.

The compositions of the invention may be thermoset or thermoplastic in nature and are preferably saturated, i.e., substantially free of unsaturated carbon-carbon bonds or aromatic groups, to produce a light stable composition. Light stability may be accomplished in a variety of ways for the purposes of this application. For example, the compositions of the invention may include only saturated components, i.e., saturated prepolymers and saturated curing agents, or include a light stabilizer to improve light stability when using aromatic components.

Modified Curative Blend

The curing agent of the invention may be modified with a freezing point depressing agent to create a curative blend with a slower onset of solidification and with storage stable pigment dispersion. In other words, the curing agent is preferably modified with a freezing point depressing agent to produce a curative blend that has a lower freezing point than the unmodified curing agent. As such, the modified curative blend results in an improved medium for pigment, such that pigment(s) contained in the modified curative blend remain in dispersed form instead of forming agglomerates when frozen.

Pigment dispersion is generally evaluated by the Hegman scale, which is a measure of particle size. The Hegman scale measures the fineness of the ground pigment, i.e., the degree of dispersion and consistency of particle size, and ranges from zero (particle sizes of greater than about 100 microns) to 8 (sub-micron particle sizes). A poor quality pigment dispersion (greater than about 100 microns), for example, would denote large pigment particles or large agglomerates, which may limit the application of the dispersion. The pigment dispersion measurement is taken by drawing down a sample of a grind block, wherein the face of the grind block is surfaced so that particles of a particular size will visibly protrude on the block at designated intervals.

After freezing and subsequent thawing, the modified curative blend of the present invention preferably has a pigment dispersion of greater than 0 on the Hegman scale, preferably about 1 or greater, and more preferably about 2 or greater. In one embodiment, the modified curative blend after a freeze/thaw cycle has a pigment dispersion of about 3 or greater on the Hegman scale. In another embodiment, the modified curative blend after a freeze and thaw is about 4 or greater on the Hegman scale, preferably about 5 or greater. In still another embodiment, the modified curative blend after a freeze and thaw is about 6 or greater on to Hegman scale. In yet another embodiment, the modified curative blend after freezing and thawing is about 7 or greater on the Hegman scale.

The modified curative blend, after a freeze/thaw cycle, preferably has a particle size of about 100 microns or less, more preferably about 89 microns or less, and even more preferably about 76 or less. In one embodiment, the particle size of the modified curative blend is about 64 or less. In another embodiment, the particle size of the modified curative blend is about 51 or less. In still another embodiment, the modified curative blend has a particle size of about 38 or less, preferably about 25.4 or less. In yet another embodiment, the particle size of the modified curative blend is about 19.1 or less, preferably about 12.7 or less.

The mesh size of the modified curative blend is also an indicator of pigment dispersion, i.e., the smaller the mesh size, the better the pigment dispersion. Thus, in one embodiment, the mesh size of the modified curative blend after a freeze/thaw cycle is about 140 or greater, preferably about 170 or greater, and more preferably about 200 or greater. In one embodiment, the mesh size of the modified curative blend is from about 140 to about 1000. In another embodiment, the mesh size is about 230 or greater. In yet another embodiment, the mesh size is about 270 or greater, preferably about 400 or greater, and more preferably about 500 or greater.

Because the modified curative blend of the present invention results in a storage stable pigment dispersion, any compatible pigment may be dispersed in the modified curative blend of the invention, even those that generally are problematic with respect to maintaining dispersion. For example, titanium dioxide is known to be difficult to maintain in dispersion because of the high concentrations typically used to obtain opacity, but the present invention provides a solution to this problem. Thus, non-limiting examples of suitable pigments include titanium dioxide ($TiO_2$), inorganic pigments such as red or yellow iron oxides, carbon black, and ultramarine blue, organic pigments such as phthalocyanine blue, phthalocyanine green, carbazole violets, and naphthol reds, and mixtures thereof.

In addition, the pigment may be incorporated into a pre-made colorant or tint, such as those commercially available from Polyone Corporation of Avon Lake, Ohio. These premade colorants or tints generally contain a pigment(s) dispersed in a grind vehicle, e.g., high molecular weight polyols. While these grind vehicles may introduce small, quantities of active hydrogen containing materials to the curative blends of the invention, these quantities are not a significant contribution to the modified curative blend of the invention.

The pigment is preferably dispersed in a blend of active hydrogen-containing materials, e.g., the modified curative blend may include at least one pigment, at least one curing agent (first active hydrogen-containing material), and at least one freezing point depressing agent (second active hydrogen-containing material). An active hydrogen-containing material, as used herein, is a material that contains at least one hydrogen that is reactive, which may occur by having a hydroxyl, primary amino, secondary amino, or thiol group. The active hydrogen-containing materials are generally describable as monomers or oligomers, rather than polymers or resins. "Monomer" will be understood as referring to molecules or compounds having a relatively low molecular weight and a simple structure capable of conversion to a polymer, resin or elastomer by combination with itself or other similar molecules or compounds. An oligomer is a combination of only a few (i.e. 4 or less) monomers. A polymer, in contrast, comprises 5 or more of such units. For example, in one embodiment, the active hydrogen-containing materials included in the modified curative blend of the present invention have a number average molecular weight of between about 30 and about 4000. In another embodiment, the number average molecular weight of the active hydrogen-containing materials is from about 90 to about 1000.

Any combination of active hydrogen-containing materials is contemplated by the present invention and the selection of materials is not limited to those expressly listed herein, as long as the blend is liquid at room temperature and below. Those of ordinary skill in the art will be able to determine the freezing point of a blend, using the standard freezing point determination. For example, an empirical method of freezing point determination is to cool the sample, which may be done by surrounding it with an ice bath while stirring, and record the temperature at regular intervals, e.g., every minute, until the material begins to solidify. As solidification occurs, the temperature begins to level off, which signifies the freezing point of the material. In addition, analytical methods of determining the freezing point may also be used such as Differential Scanning Calorimetry (DSC).

The active hydrogen-containing materials may include curing agents, such as hydroxy-terminated curing agents or amine-terminated curing agents. Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol, preferably having a molecular weight ranging from about 250 to about 3900; resorcinol-di-(beat-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; N,N-bis(β-hydroxypropyl)aniline; 2-propanol-1,1'-phenylaminobis; and mixtures thereof. The hydroxy-terminated curing agent may have a molecular weight of at least about 50. In one embodiment, the molecular weight of the hydroxy-terminated curing agent is about 2000 or less.

In addition, suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5;dimethylthio-2,4-toluenediamine; 3,5-dimethylthio-2,6-toluenediamine; 3,5-diethylthio-2,4-toluenediamine; 3,5;diethylthio-2,6-toluenediamine; 4,4'-bis-(sec-butylamino)-diphe nylme thane and derivatives thereof; 1,4-bis-(sec-butylamino)-benzene; 1,2-bis-(sec-butylamino)-benzene; N,N'-dialkylaminodiphenylmethane; N,N,N',N'-tetrakis (2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

As discussed above, each active hydrogen-containing material may have a different freezing point, e.g., a curing agent with a freezing point of room temperature and a second active hydrogen-containing material, e.g., a freezing point depressing agent, with a freezing point well below room temperature. The selection of two active hydrogen-containing agents with different freezing points results in an overall blend with a lower freezing point than if the curing agent were used alone. For example, in one embodiment, the differential between the freezing point of the curing agent and the freezing point of the curative blend is about 5° F. or greater, preferably about 10° F. or greater. In another embodiment, the differential is about 15° F. or greater, preferably about 20° F. or greater. Thus, the selection of the freezing point depressing agent is correlative with the selection of the other active hydrogen-containing material, i.e., the curing agent.

The freezing point depressing agent preferably has a freezing point of about 20° F. or less, more preferably about 10° F. or less. In one embodiment, the freezing point depressing agent has a freezing point of about 0° F. or less. In another embodiment, the freezing point of the freezing point depressing agent is about −10° F. to about −120° F. In still another embodiment, the freezing point of the freezing point depressing agent is about 10° F. to about 100° F. In yet another embodiment, the freezing point is about −30° F. to about −70° F.

Suitable freezing point depressing agents may include any agents that stabilize the pigment dispersion of the curative blend when the temperature drops below room temperature. For example, 2-methyl-1,3-propanediol has a freezing point of −65° F. When about 10 percent by weight of the 2-methyl-1,3-propanediol is added to a curative blend containing 1,4-butane diol, which has a freezing point of 68° F., the freezing point of the curative blend lowers to about 44° F. Thus, in one embodiment, the freezing point depressing agent is selected so that the freezing point of the blend is about 60° F. or less. In another embodiment, the freezing point depressing agent is chosen so that the blend has a freezing point of about 50° F. or less. In still another embodiment, the freezing point depressing agent modifies the blend so that the freezing point of the blend is about 45° F. or less. In yet another embodiment, the freezing point of the blend is about 32° F. or less after addition of the freezing point depressing agent.

The freezing point depressing agent is preferably compatible with the curing agent. For example, a hydroxy-terminated curing agent such as 1,4-butanediol may be modified with a hydroxy-terminated freezing point depressing agent or a mixture of hydroxy-terminated freezing point depression agents. Examples of hydroxy-terminated freezing point depressing agents include, but are not limited to, 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, dipropylene glycol, and mixtures thereof.

In addition, a number of amine-terminated curing agents have relatively high freezing points, e.g., hexamethylene diamine (105.8° F.), diethanolamine (82.4° F.), triethanol amine (69.8° F.), diisopropanolamine (73.4° F.), and triisopropanolamine (111.2° F.). Such amine-terminated curing agents may be modified with an amine-terminated freezing point depressing agent or a mixture of amine-terminated freezing point depressing agents. Suitable amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof.

In one embodiment, the modified curative blend includes an alcohol having a molecular weight of less than about 200 and another active hydrogen-containing material that is not a dihydroxy compound, but contains an ester group, and has a molecular weight from about 204 to about 500.

The freezing point depressing agent is preferably added in an amount sufficient to reduce the freezing point of the curing agent by a suitable amount to prevent loss of pigment dispersion, but not affect the physical properties of the golf ball. In one embodiment, the freezing point depressing agent is added to the curing agent in an amount of about 5 percent or greater by weight of the curative blend, i.e., curing agent(s), freezing point depressing agent. In another embodiment, the freezing point depressing agent is present in an amount of about 8 percent greater by weight of the curative blend. In still another embodiment, the freezing point depressing agent is present in an amount of about 10 percent or greater. In yet another embodiment, the curative blend includes the freezing point depressing agent in an amount of about 12 percent or greater by weight of the curative blend. The curative blend may also include a freezing point depressing agent in an amount of about 14 percent or greater by weight of the curative blend.

For example, in one embodiment of the present invention, the modified curative blend includes about 90 percent by weight of a curing agent and about 10 percent by weight of a freezing point depressing agent. Those of ordinary skill in the art are aware that a relatively minor portion of the modified curative blend will need to have a freezing point of room temperature and below in order to achieve the liquid, storage stable characteristics of the modified curative blend contemplated by the present invention. This proper balance results in a modified curative blend that retains its beneficial properties without sacrificing pigment dispersion or freezing at relatively high temperatures.

The pigment is preferably included in the modified curative blend in an amount of about 10 percent to about 70 percent by weight of the total curative blend, i.e., curing agent(s), freezing point depressing agent(s), and pigment. In one embodiment, the pigment is included in the modified curative blend in an amount of about 15 percent to about 55 percent by weight of the total curative blend. In another embodiment, the pigment is present in the modified curative blend in an amount of about 23 percent by weight of the total curative blend. The blend of curing agent(s) and freezing point depressing agent(s) is preferably included in the total curative blend in an amount of about 30 percent to about 90 percent by weight. In one embodiment, the blend of curing agent(s) and freezing point depressing agent(s) is included in the total curative blend in an amount of about 50 weight percent to about 80 weight percent, preferably about 50 weight percent to about 70 weight percent.

In one embodiment, the modified curative blend is substantially free of dimethyl sulfoxide. As used herein, "substantially free" means less than about 3 percent by weight of the blend, preferably less than about 1 percent by weight of the blend, more preferably less than about 0.5 percent by weight of the blend.

The modified curative blends of the present invention may be solvent free. As used herein, "solvent free" means about 1 percent or less, preferably about 0.5 percent or less, of solvent, e.g., water, alcohol, ketones, aromatic solvents, and the like.

The modified curative blend of the present invention may be made in any suitable manner. For example, in one method, a pigment is incorporated into a mixture of at least one curing agent and at least one freezing point depressing agent. This may be accomplished through blending with a cowles grind or mill grind. Alternatively, the pigment may added to the curing agent first, and then the curing agent/pigment blend is combined with the freezing point depressing agent or the pigment may be added to the freezing point depressing agent before incorporating the curing agent. As discussed above, the pigment may be titanium dioxide ($TiO_2$), inorganic or organic pigments, or commercially available pigments in grind vehicles. When using a commercially available pigment in a grind vehicle, simple mixing may be employed because the pigment would not need to be ground into the curing agent, freezing point depressing agent, or curative blend. Standard additives, if used, may be added at any step in the process.

Polyurethane Composition

As mentioned, the compostions of the invention are polyurethane-based, i.e., a product of a reaction between at least one polyurethane prepolymer and a curing agent, of which the polyurethane prepolymer is a product formed by a reaction between at least one polyol and at least one diisocyanate. The polyurethane-based compositions of the invention are preferably saturated and, thus, in one embodiment, the composition of the invention is the product of a reaction between at least one saturated polyurethane prepolymer, formed of at least one saturated diisocyanate and at least one saturated polyol, and at least one saturated curing agent.

Isocyanate Component

Saturated isocyanates for use with the polyurethane prepolymer include aliphatic, cycloaliphatic, araliphatic, derivatives thereof, and combinations of these compounds having two or more isocyanate (NCO) groups per molecule. The isocyanates may be organic, modified organic, organic polyisocyanate-terminated prepolymers, and mixtures thereof. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more. Suitable isocyanate-containing components include diisocyanates having the generic structure: O=C=N—R—N=C=O, where R is preferably a cyclic or linear or branched hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Examples of saturated diisocyanates that can be used in the polyurethane prepolymer include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3, 5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophoronediisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophoronediisocyanate (IPDI), 4,4'-dicyclohexylmethane diisocyanate ($H_{12}$MDI), 1,6-hexamethylene diisocyanate (HDI), or a combination thereof.

The number of unreacted NCO groups in the polyurethane prepolymer may be varied to control such factors as the speed of the reaction, the resultant hardness of the composition, and the like. For instance, the number of unreacted NCO groups in the polyurethane prepolymer of isocyanate and polyol may be less than about 14 percent. In one embodiment, the polyurethane prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurethane polymer may be about 7.5 percent or less, and more preferably, about 7 percent or less. In another embodiment, the unreacted NCO content is from about 2.5 percent to about 7.5 percent, and more preferably from about 4 percent to about 6.5 percent.

Unsaturated diisocyanates, i.e., aromatic compounds, may also be used with the present invention, although the use of unsaturated compounds in the prepolymer is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI, carbodiimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4''-triisocyanate, napthylene-1,5,-diisocyanate, 2,4'-, 4,4'-, and 2,2-biphenyl diisocyanate, polyphenyl polymethylene polyisocyanate (PMDI), and mixtures thereof.

Polyol Component

Any saturated polyol available to one of ordinary skill in the art is suitable for use in the polyurethane prepolymer. Exemplary polyols include, but are not limited to, polyether polyols, polycaprolactone polyols, polyester polyols, polycarbonate polyols, hydrocarbon polyols, and mixtures thereof. Suitable saturated polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene)glycol; poly(oxypropylene)glycol; poly(ethylene oxide capped oxypropylene)glycol; and mixtures thereof.

Saturated polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable saturated polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; and mixtures thereof. An example of a polycarbonate polyol that may be used with the present invention includes, but is not limited to, poly(hexamethylene carbonate) glycol.

Hydrocarbon polyols include, but not limited to, hydroxy-terminated liquid isoprene rubber (LIR), hydroxy-terminated polybutadiene polyol, saturated hydroxy-terminated hydrocarbon polyols, and mixtures thereof. Other aliphatic polyols that may be used to form the prepolymer of the invention include, but not limited to, glycerols; castor oil and its derivatives; Kraton polyols; acrylic polyols; acid functionalized polyols based on a carboxylic, sulfonic, or phosphoric acid group; dimer alcohols converted from the saturated dimerized fatty acid; and mixtures thereof.

When formed, polyurethane prepolymers may contain about 10 percent to about 20 percent by weight of the prepolymer of free isocyanate monomer. Thus, in one embodiment, the polyurethane prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyurethane prepolymer may be formed with a single curing agent or a blend or mixture of curing agents. The curing agent of the invention is preferably modified with a freezing point depressing agent as discussed above.

Curative

Saturated curatives for use with the present invention include, but are not limited to, hydroxy terminated curing agents, amine-terminated curing agents, and mixtures thereof. Depending on the type of curing agent used, the polyurethane composition may be thermoplastic or thermoset in nature. For example, polyurethanes prepolymers cured with a diol or secondary diamine with 1:1 stoichiometry are thermoplastic in nature. Thermoset polyurethanes, on the other hand, are generally produced from a prepolymer cured with a primary diamine or polyfunctional glycol.

In addition, the type of curing agent used determines whether the polyurethane composition is polyurethane-urethane or polyurethane-urea. For example, a polyurethane prepolymer cured with a hydroxy-terminated curing agent is polyurethane-urethane because any excess isocyanate groups will react with the hydroxyl groups of the curing agent to create more urethane linkages. In contrast, if an amine-terminated curing agent is used with the polyurethane prepolymer, the excess isocyanate groups will react with the amine groups of the amine-terminated curing agent to create urea linkages.

Suitable saturated hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; triisopropanolamine; diethylene glycol di-(aminopropyl)ether; 1,5-pentanediol; 1,6-hexanediol; glycerol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol having molecular weight ranging from about 250 to about 3900; and mixtures thereof. In one embodiment, the hydroxy-terminated curing agent has a molecular weight of at least 50. In another embodiment, the molecular weight of the hydroxy-terminated curing agent is about 2000 or less. In yet another embodiment, the hydroxy-terminated curing agent has a molecular weight of about 250 to about 3900. It should be understood that molecular weight, as used herein, is the absolute weight average molecular weight and would be understood as such by one of ordinary skill in the art.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; N,N,N',N'-tetrakis (2-hydroxypropyl)-ethylene diamine; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-propylamine; monoethanolamine, diethanolamine; triethanolamine; monoisopropanolamine, diisopropanolamine; triisopropanolamine; isophoronediamine; and mixtures thereof. In one embodiment, the amine-curing agent has a molecular weight of about 64 or greater. In another embodiment, the molecular weight of the amine-curing agent is about 2000 or less.

Polyurea Composition

The compositions of the invention may also be polyurea-based, which are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Polyamine Component

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene)ether diamines; propylene oxide-based triamines; triethyleneglycoldiamines; trimethylolpropane-based triamines; glycerin-based triamines; and mixtures thereof. In one embodiment, the polyether amine used to form the prepolymer is Jeffamine D2000 (manufactured by Huntsman Corporation of Austin, Tex.).

The molecular weight of the polyether amine for use in the polyurea prepolymer may range from about 100 to about 5000. As used herein, the term "about" is used in connection with one or more numbers or numerical ranges, should be understood to refer to all such numbers, including all numbers in a range. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as Jeffamine D2000, is preferred.

In one embodiment, the polyether amine has the generic structure:

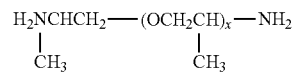

wherein the repeating unit x has a value ranging from about 1 to about 70. Even more preferably, the repeating unit may be from about 5 to about 50, and even more preferably is from about 12 to about 35.

In another embodiment, the polyether amine has the generic structure:

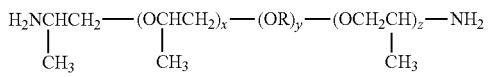

wherein the repeating units x and z have combined values from about 3.6 to about 8 and the repeating unit y has a value ranging from about 9 to about 50, and wherein R is —$(CH_2)_a$—, where "a" may be a repeating unit ranging from about 1 to about 10.

In yet another embodiment, the polyether amine has the generic structure:

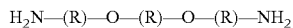

wherein R is —$(CH_2)_a$—, and "a" may be a repeating unit ranging from about 1 to about 10.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (Clearlink 1000) may be suitable for use in combination with an isocyanate to form the polyurea prepolymer.

Isocyanate Component

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenyl polymethylene polyisocyanate (PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

Curative

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclo hexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5;dimethylthio-2,4-toluenediamine; 3,5-dimethylthio-2,6-toluenediamine; 3,5-diethylthio-2,4-toluenediamine; 3,5;diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis (2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methyla mine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

In addition, the polyurea prepolymer may be cured with a single hydroxy-terminated curing agent or a mixture of hydroxy-terminated curing agents. Once a hydroxy-terminated curing agent is used, however, the excess isocyanate in the polyurea prepolymer reacts with the hydroxyl groups in the curing agent and forms urethane linkages, which results in a composition that is no longer pure polyurea, but instead a polyurea-urethane composition. The hydroxy-terminated curing agent is preferably modified with a hydroxy-terminated freezing point depressing agent as discussed above.

Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy} cyclohexane; trimethylolpropane; polytetramethylene ether glycol, preferably having a molecular weight ranging from about 250 to about 3900; resorcinol-di-(beat-hydroxyethyl) ether and its derivatives; hydroquinone-di-(beta-hydroxyethyl)ether and its derivatives; 1,3-bis-(2-hydroxyethoxy) benzene; 1,3-bis-[2-(2-hydroxyethoxy)ethoxy]benzene; N,N-bis(β-hydroxypropyl)aniline; 2-propanol-1,1'-phenylaminobis; and mixtures thereof. The hydroxy-terminated curing agent may have a molecular weight of at least about 50. In one embodiment, the molecular weight of the hydroxy-terminated curing agent is about 2000 or less.

Suitable saturated hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy] ethoxy}cyclohexane; trimethylolpropane; polytetramethylene ether glycol having molecular weight ranging from about 250 to about 3900; and mixtures thereof. In one embodiment, the hydroxy-terminated curing agent has a molecular weight of at least 50. In another embodiment, the molecular weight of the hydroxy-terminated curing agent is about 2000 or less.

Both types of curing agents, i.e., hydroxy-terminated and amine curatives, may include one or more saturated, unsaturated, aromatic, and cyclic groups. Additionally, the hydroxy-terminated and amine curatives may include one or more halogen groups.

Skilled artisians are aware that the various properties of the golf ball and golf ball components, e.g., hardness, may be controlled by adjusting the ratio of prepolymer to curing agent, which is a function of the NCO content of the prepolymer and molecular weight of the curing agent. For example, the ratio of a polyurea prepolymer with 6 percent unreacted NCO groups cured with 1,4-butanediol is 15.6:1, whereas the ratio of the same prepolymer cured with 4,4'-bis-(sec-butylamino)-dicyclohexylmethane (Clearlink 1000) is 4.36:1. The ratio of prepolymer to curing agent for the purposes of this invention is preferably from about 0.5:1 to about 16:1.

Composition Additives

Additional materials conventionally included in polyurethane and polyurea compositions may be added to the polyurethane and polyurea prepolymers, the modified curative blends, or the composite compositions of the invention. These additional materials include, but are not limited to, catalysts, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

Catalysts

A catalyst may also be employed to promote the reaction between the prepolymer and the curing agent for both the polyurethane and polyurea compositions. Suitable catalysts include, but are not limited to bismuth catalyst; zinc octoate; stannous octoate; tin catalysts such as di-butyltin dilaurate (DABCO® T-12 manufactured by Air Products and Chemicals, Inc.), di-butyltin diacetate (DABCO® T-1); stannous octoate (DABCO® T-9); tin (II) chloride, tin (IV) chloride, di-butyltin dimethoxide (FASCAT®4211), dimethyl-bis[1-oxonedecyl)oxy]stannane (FORMEZ® UL-28), di-n-octyltin bis-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLYCAT™ SA-1, POLYCAT™ SA-2, POLYCAT™, and the like; and mixtures thereof. In one embodiment, the catalyst is di-butyltin dilaurate.

The catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as di-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

Density-Adjusting Filler(s)

Fillers may be added to the polyurethane and polyurea compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful.

Either injection molding or compression molding may be used to form a layer or a core including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Light Stabilizers

The compositions of the invention may contain at least one light stabilizing component to prevent significant yellowing from unsaturated components contained therein. The use of a light stabilizer is preferred, for instance, for compositions having a difference in yellowness (*Y) of about 15 or greater, but also may be added to compositions having a difference in yellowness of from about 12 to about 15. As used herein, light stabilizer may be understood to include hindered amine light stabilizers, ultraviolet (UV) absorbers, and antioxidants.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba-Geigy. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

As discussed, the compositions of the invention preferably include only saturated components because unsaturated components yellow over a period of time. While saturated compositions are resistant to discoloration, they are not immune to deterioration in their mechanical properties upon weathering. Addition of UV absorbers and light stabilizers to any of the above compositions may help to maintain the tensile strength, elongation, and color stability. The use of light stabilizing components also may assist in preventing cover surface fractures due to photodegradation. Thus, suitable UV absorbers and light stabilizers, as listed above, may also be included in the saturated compositions of the invention.

To further improve the shear resistance and heat resistance of the resulting polyurea elastomers, a multi-functional curing agent can be used to help improve cross-linking. In one embodiment of the present invention, the multi-functional curing agent is modified with a compatible freezing point depressing agent as detailed above. For example, a triol such as trimethylolpropane or a tetraol such as N,N,N',N'-tetrakis (2-hydroxylpropyl)ethylenediamine may be added to the composition. In one embodiment, a primary diamine, such as 3,3'-dimethyl-4,4'-diaminodicyclohexylmethane or 4,4'-diaminodicyclohexylmethane is added to the polyurea composition. Useful triamine curing agents for improving the crosslinking of polyurea elastomers include, but are not limited to: propylene oxide-based triamines; trimethylolpropane-based triamines; glycerin-based triamines; N,N-bis{2-[(aminocarbonyl)amino]ethyl}-urea; N,N',N"-tris(2-aminoethyl)-methanetriamine; N1-(5-aminopentyl)-1,2,6-hexanetriamine; 1,1,2-ethanetriamine; N,N',N"-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl)amino]butyl]amino]propyl}-1,2,6-hexanetriamine; di-9-octadecenyl-(Z,Z)-1,2,3-propanetriamine; 1,4,8-octanetriamine; 1,5,9-nonanetriamine; 1,9,10-octadecanetriamine; 1,4,7-heptanetriamine; 1,5,10-decanetriamine; 1,8,17-heptadecanetriamine; 1,2,4-butanetriamine; propanetriamine; 1,3,5-pentanetriamine; N1-{3-[[4-[(3-aminopropyl)amino]butyl]amino]propyl}-1,2,6-hexanetriamine; N1-{4-[(3-aminopropyl)amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3,6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N2-(3-aminopropyl)-1,2,5-pentanetriamine; N1-(2-aminoethyl)-1,2,6-hexanetriamine; 2,6,11-trimethyl-2,6,11-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1,1-ethanetriamine; N1,N1-bis(2-aminoethyl) 1,2-propanediamine; 1,2,3-propanetriamine; 2-methyl-1,2,3-propanetriamine; and mixtures thereof.

Fragrance Components

Some materials used in the polyurethane or polyurea compositions of the invention are odorous in nature or produce odors during reaction with other materials or with oxygen. For example, the odor of curative Ethacure 300 is attributed to dimethyl disulfide (DMDS) once the product reacts with oxygen. As used herein, a material or component is odorous when the odor threshold surpasses a threshold of 0.029 mg/m$^3$ in air. A fragrance or masking component may be added to the compositions of the invention to eliminate odors.

The fragrance component is preferably added in an amount of about 0.01 percent to about 1.5 percent by weight of the composition. In one embodiment, the fragrance component is added to the composition in an amount of about 0.03 percent or greater by weight of the composition. In another embodiment, the fragrance component is added to the composition in an amount of about 1.2 percent or less by weight of the composition. In yet another embodiment, the fragrance component is added in an amount of about 0.5 percent to about 1 percent by weight of the composition. For example, an optimum loading of the fragrance component may be about 0.08 percent by weight of the composition, but adding more may enhance the effect is needed.

Suitable fragrance components include, but are not limited to, Long Lasting Fragrance Mask #59672, Long Lasting Fragrance Mask #46064, Long Lasting Fragrance Mask #55248, Non-Descript Fragrance Mask #97779, Fresh and Clean Fragrance Mask #88177, and Garden Fresh Fragrance Mask #87473, all of which are manufactured by Flavor and Fragrance Specialties of Mahwah, N.J. Other non-limiting examples of fragrance components that may be added to the compositions of the invention include benzaldehyde, benzyl benzoate, benzyl propionate, benzyl salicylate, benzyl alcohol, cinnamic aldehydes, natural and essential oils derived from botanical sources, and mixtures thereof.

Composition Blends

The compositions of the invention preferably include from about 1 percent to about 100 percent polyurethane or polyurea, depending on whether the compositions are polyurethane-based or polyurea-based, however, the compositions may be blended with other materials. In one embodiment, the composition contains about 10 percent to about 90 percent of polyurethane or polyurea, preferably from about 10 percent to about 75 percent polyurethane or polyurea, and contains about 90 percent to 10 percent, more preferably from about 90 percent to about 25 percent other polymers and/or other materials as described below.

Other polymeric materials suitable for blending with the compositions of the invention include castable thermoplastic or thermoset polyurethanes, cationic and anionic urethane ionomers and urethane epoxies, polyurethane/polyurea ionomers, epoxy resins, polyethylenes, polyamides and polyesters, polycarbonates, polyacrylin, and mixtures thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety. These examples are intended to be non-limiting examples of blends to be used with the present invention.

Acid Functionalization of Compositions

The present invention also contemplates the acid functionalization of the polyurethane and polyurea compositions of the invention as disclosed in U.S. patent application Ser. No. 10/072,395, filed on Feb. 5, 2002, entitled "Golf Ball Compositions Comprising a Novel Acid Functional Polyurethane, Polyurea, or Copolymer Thereof", which is incorporated by reference herein in its entirety. Without being bound to any particular theory, it is believed that polyurethanes and polyurea including acid functional moieties or groups have improved adhesion to other components or layers. The acid functional group is preferably based on a sulfonic group ($HSO_3$), carboxylic group ($HCO_2$), phosphoric acid group ($H_2PO_3$), or a combination thereof. More than one type of acid functional group may be incorporated into the polyurea or polyurethane.

In one embodiment, the acid functional polyurethane or polyurea is prepared from a prepolymer having acid functional moieties. The acid group(s) may be incorporated onto the isocyanate moiety or polyol component when making a polyurethane composition. When making a polyurea composition of the invention, the acid group(s) may be incorporated onto the isocyanate or polyether amine component.

Suitable acid functional polyols for use in the polyurethane compositions of the invention, along with reagents and methods used to derive such acid functional polyols, are disclosed in detail in U.S. Pat. Nos. 5,661,207 and 6,103,822, the disclosures of which are incorporated herein by reference in their entirety. In one embodiment, acid functional polyols for use in a polyurethane prepolymer includes carboxylated, sulfonated, or phosphonated derivatives of polyester polyols. Suitable acid functional polyols may have an acid number (calculated by dividing acid equivalent weight to 56,100) of at least about 10, preferably from about 20 to about 420, more preferably from about 25 to about 150, and most preferably from about 30 to about 75. In addition, the hydroxyl number (calculated by dividing hydroxyl equivalent number to 56,100) of the polyols may be at least about 10, preferably from about 20 to about 840, and more preferably from about 20 to about 175, and most preferably from about 50 to about 150. The polyols may also have a hydroxyl functionality (average number of hydroxyl groups per polyol molecule) of at least about 1.8, preferably from about 2 to about 4.

Suitable acid functional isocyanates include conventional isocyanates having an acid functional group that may be formed by reacting a isocyanate and an acid functional group containing compound as described in U.S. Pat. Nos. 4,956, 438 and 5,071,578, the disclosures of which are incorporated herein by reference in their entirety.

The acid group(s) may also be incorporated during a post-polymerization reaction, wherein the acid functional group(s) is introduced or attached to the polyurethane or polyurea. Moreover, the acid functional polyurea or polyurethanes made by way of copolymerization as described above may be further incorporated with additional acid functional groups through such post-polymerization reactions. Suitable agents to incorporate acid functional groups onto the polyurethane or polyurea and methods for making are described in U.S. Pat. No. 6,207,784, the entire disclosure of which is incorporated by reference herein.

One of ordinary skill in the art would be aware of other ways to prepare the acid functional polyurea or polyurethane. For example, a combination of the embodiments described above may be used as described in U.S. Pat. No. 5,661,207, the disclosure of which is incorporated by reference in its entirety herein.

The acid functional polyurethanes or polyurea may be partially or fully neutralized with an organic or an inorganic metal base and/or a tertiary amine to produce anionic polyurethanes/polyurea ionomers. The base may be added during preparation of the prepolymer or as a separate neutralization step on the already polymerized acid functional polyurethane and polyurea. If these stages occur simultaneously, the base is preferably present throughout all stages.

Suitable metal bases used for partial or total neutralization may include compounds such as metal oxides, metal hydroxides, metal carbonates, metal bicarbonates and metal acetates. The metal ions may include, but are not be limited to, Group IA, IB, IIA, IIB, IIIA, IIIB, IVA, IVB, VA, VB, VIA, VIB, VIIB and VIIIB metal ions. Preferred metallic ions of such bases include lithium, sodium, potassium, magnesium, zinc, calcium, manganese, aluminum, tungsten, zirconium, titanium and hafnium. The amines are preferably hindered organic tertiary amines such as tributylamine, triethylamine, triethylene diamine, dimethyl cetylamine and similar compounds. Primary or secondary amines may be used, preferably only if the neutralization step takes place after the polymer is formed, because the amine hydrogen will readily react with the isocyanate groups thereby interfering with the polyurea or polyurethane polymerization. One of ordinary skill in the art is aware of additional appropriate chemicals for neutralization.

Golf Ball Core Layer(s)

The cores of the golf balls formed according to the invention may be solid, semi-solid, hollow, fluid-filled or powder-filled, one-piece or multi-component cores. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. As mentioned above, the polyurethane or polyurea compositions of the present invention may also be incorporated into any component of a golf ball, including the core.

In one embodiment, the golf ball core is formed from a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending and co-assigned U.S. patent application Ser. No. 10/190,705, entitled "Low Compression, Resilient Golf Balls With Rubber Core," filed Jul. 9, 2002, the entire disclosure of which is incorporated by reference herein, may be used to form the reaction product. Although this polybutadiene reaction product is discussed in a section pertaining to core compositions, the present invention also contemplates the use of the reaction product to form at least a portion of any component of a golf ball.

Polybutadiene Component

To obtain a higher resilience and lower compression, a high-molecular weight polybutadiene with a cis-isomer content preferably greater than about 40 percent is converted to increase the percentage of trans-isomer content at any point in the golf ball or portion thereof. In one embodiment, the cis-isomer is present in an amount of greater than about 70 percent, preferably greater than about 80 percent, and more preferably greater than about 90 percent of the total polybutadiene content. In still another embodiment, the cis-isomer is present in an amount of greater than about 95 percent, and more preferably greater than about 96 percent, of the total polybutadiene content.

A low amount of 1,2-polybutadiene isomer ("vinyl-polybutadiene") is desired in the initial polybutadiene, and the reaction product. In one embodiment, the vinyl polybutadiene isomer content is less than about 7 percent, preferably less than about 4 percent, and more preferably less than about 2 percent.

The polybutadiene material may have a molecular weight of greater than about 200,000. In one embodiment, the polybutadiene molecular weight is greater than about 250,000, and more preferably from about 300,000 to 500,000. In another embodiment, the polybutadiene molecular weight is about 400,000 or greater. It is preferred that the polydispersity of the material is no greater than about 2, more preferably no greater than 1.8, and even more preferably no greater than 1.6.

In one embodiment, the polybutadiene has a Mooney viscosity greater than about 20, preferably greater than about 30, and more preferably greater than about 40. Mooney viscosity is typically measured according to ASTM D-1646. In another embodiment, the Mooney viscosity of the polybutadiene is greater than about 35, and preferably greater than about 50. In one embodiment, the Mooney viscosity of the unvulcanized polybutadiene is from about 40 to about 80. In another embodiment, the Mooney viscosity is from about 45 to about 60, more preferably from about 45 to about 55.

In one embodiment, the center composition includes at least one rubber material having a resilience index of at least about 40. In another embodiment, the resilience index of the at least one rubber material is at least about 50.

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

Catalyst(s)

Without being bound by any particular theory, it is believed that the cis-to-trans catalyst component, in conjunction with the free radical source, acts to convert a percentage of the polybutadiene polymer component from the cis- to the transconformation. Thus, the cis-to-trans conversion preferably includes the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof.

As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof. In one embodiment, the cis-to-trans catalyst is a blend of an organosulfur component and an inorganic sulfide component or a Group VIA component.

As used herein when referring to the invention, the term "organosulfur compound(s)" or "organosulfur component(s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component. It is preferred that the cis-to-trans catalyst is present in an amount sufficient to increase the trans-polybutadiene isomer content at least about 15 percent, more preferably at least about 20 percent, and even more preferably at least about 25 percent.

Therefore, the cis-to-trans catalyst is preferably present in an amount from about 0.1 to about 25 parts per hundred of the total resilient polymer component. As used herein, the term "parts per hundred", also known as "phr", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In one embodiment, the cis-to-trans catalyst is present in an amount from about 0.1 to about 12 phr of the total resilient polymer component. In another embodiment, the cis-to-trans catalyst is present in an amount from about 0.1 to about 10 phr of the total resilient polymer component. In yet another embodiment, the cis-to-trans catalyst is present in an amount from about 0.1 to about 8 phr of the total resilient polymer component. In still another embodiment, the cis-to-trans catalyst is present in an amount from about 0.1 to about 5 phr of the total resilient polymer component. The lower end of the ranges stated above also may be increased if it is determined that 0.1 phr does not provide the desired amount of conversion. For instance, the amount of the cis-to-trans catalyst is present may be about 0.5 or more, 0.75 or more, 1.0 or more, or even 1.5 or more.

Suitable organosulfur components for use in the invention include, but are not limited to, at least one of diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl) disulfide; 1,1'-bis(6-aminonaphthyl)disulfide; 1,1'-bis(7-aminonaphthyl)disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl)disulfide; bis(3-chlorophenyl) disulfide; bis(4-bromophenyl)disulfide; bis(2-bromophenyl) disulfide; bis(3-bromophenyl)disulfide; bis(4-fluorophenyl) disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl) disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl) disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. Most preferred organosulfur components include diphenyl disulfide, 4,4'-ditolyl disulfide, or a mixture thereof, especially 4,4'-ditolyl disulfide.

In one embodiment, the at least one organosulfur component is substantially free of metal. As used herein, the term "substantially free of metal" means less than about 10 weight percent, preferably less than about 5 weight percent, more preferably less than about 3 weight percent, even more preferably less than about 1 weight percent, and most preferably less than about 0.01 weight percent. Suitable substituted or unsubstituted aromatic organic components that do not include sulfur or a metal include, but are not limited to, diphenyl acetylene, azobenzene, or a mixture thereof. The aromatic organic group preferably ranges in size from $C_6$ to $C_{20}$, and more preferably from $C_6$ to $C_{10}$.

In one embodiment, the organosulfur cis-to-trans catalyst is present in the reaction product in an amount from about 0.5 phr or greater. In another embodiment, the cis-to-trans catalyst including a organosulfur component is present in the reaction product in an amount from about 0.6 phr or greater. In yet another embodiment, the cis-to-trans catalyst including a organosulfur component is present in the reaction product in an amount from about 1.0 phr or greater. In still another embodiment, the cis-to-trans catalyst including a organosulfur component is present in the reaction product in an amount from about 2.0 phr or greater.

Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. In one embodiment, the metal-containing organosulfur cis-to-trans catalyst is present in the reaction product in an amount from about 1.0 phr or greater. In another embodiment, the cis-to-trans catalyst including a Group VIA component is present in the reaction product in an amount from about 2.0 phr or greater. In yet another embodiment, the cis-to-trans catalyst including a Group VIA component is present in the reaction product in an amount from about 2.5 phr or greater. In still another embodiment, the cis-to-trans catalyst including a Group VIA component is present in the reaction product in an amount from about 3.0 phr or greater.

The organosulfur component may also be an halogenated organosulfur compound. Halogenated organosulfur compounds include, but are not limited to those having the following general formula:

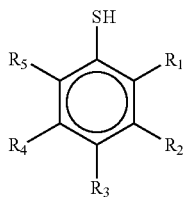

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 phr, more preferably between about 2.3 phr and about 5 phr, and most preferably between about 2.3 and about 4 phr.

The cis-to-trans catalyst may also include a Group VIA component. As used herein, the terms "Group VIA component" or "Group VIA element" mean a component that includes a sulfur component, selenium, tellurium, or a combination thereof. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt of Norwalk, Conn.

In one embodiment, the cis-to-trans catalyst including a Group VIA component is present in the reaction product in an amount from about 0.25 phr or greater. In another embodiment, the cis-to-trans catalyst including a Group VIA component is present in the reaction product in an amount from about 0.5 phr or greater. In yet another embodiment, the cis-to-trans catalyst including a Group VIA component is present in the reaction product in an amount from about 1.0 phr or greater.

Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. In one embodiment, the cis-to-trans catalyst including an inorganic sulfide component is present in the reaction product in an amount from about 0.5 phr or greater. In another embodiment, the cis-to-trans catalyst including a Group VIA component is present in the reaction product in an amount from about 0.75 phr or greater. In yet another embodiment, the cis-to-trans catalyst including a Group VIA component is present in the reaction product in an amount from about 1.0 phr or greater.

When a reaction product includes a blend of cis-to-trans catalysts including an organosulfur component and an inorganic sulfide component, the organosulfur component is preferably present in an amount from about 0.5 or greater, preferably 1.0 or greater, and more preferably about 1.5 or greater and the inorganic sulfide component is preferably present in an amount from about 0.5 phr or greater, preferably 0.75 phr or greater, and more preferably about 1.0 phr or greater.

A substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$—$R_3$-M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium.

Free Radical Source(s)

A free-radical source, often alternatively referred to as a free-radical initiator, is preferred in the composition and method. The free-radical source is typically a peroxide, and preferably an organic peroxide, which decomposes during the cure cycle. Suitable free-radical sources include organic peroxide compounds, such as di-t-amyl peroxide, di(2-t-butylperoxyisopropyl)benzene peroxide or α,α-bis(t-butylperoxy)diisopropylbenzene, 1,1-bis(t-butylperoxy)-3,3,5-trimethylcyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98 percent active and has an active oxygen content of 5.8 percent, whereas PERKODOX® DCP-70 is 70 percent active and has an active oxygen content of 4.18 percent. The peroxide is may be present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. If the peroxide is present in pure form, it is preferably present in an amount of at least about 0.25 phr, more preferably between about 0.35 phr and about 2.5 phr, and most preferably between about 0.5 phr and about 2 phr. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 phr of a pure peroxide is equivalent 4 phr of a concentrate peroxide that is 50 percent active (i.e., 2 divided by 0.5=4).

In one embodiment, the amount of free radical source is about 5 phr or less, but also may be about 3 phr or less. In another embodiment, the amount of free radical source is about 2.5 phr or less. In yet another embodiment, the amount of free radical source is about 2 phr or less. In still another embodiment, the amount of free radical source is about 1 phr or less preferably about 0.75 phr or less.

It should be understood by those of ordinary skill in the art that the presence of certain cis-to-trans catalysts according to the invention be more suited for a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. A skilled artisian is aware that heat often facilitates initiation of the generation of free radicals.

In one embodiment, the ratio of the free radical source to the cis-to-trans catalyst is about 10 or less, but also may be about 5 or less. Additionally, the ratio of the free radical source to the cis-to-trans catalyst may be from about 4 or less, but also may be about 2 or less, and also may be about 1 or less. In another embodiment, the ratio of the free radical source to the cis-to-trans catalyst is about 0.5 or less, preferably about 0.4 or less. In yet another embodiment, the free radical source cis-to-trans catalyst ratio is greater than about 1.0. In still another embodiment, the free radical source cis-to-trans catalyst is about 1.5 or greater, preferably about 1.75 or greater.

Crosslinking Agent(s)

Crosslinkers may be included to increase the hardness of the reaction product. Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. In one embodiment, zinc methacrylate is used in combination with the zinc salt of pentachlorothiophenol.

The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the polymer component, preferably from about 10 to 50 percent of the polymer component, more preferably from about 10 to 40 percent of the polymer component.

In one embodiment, the crosslinking agent is present in an amount greater than about 10 parts per hundred ("phr") parts of the base polymer, preferably from about 20 to about 40 phr of the base polymer, more preferably from about 25 to about 35 phr of the base polymer.

When an organosulfur is selected as the cis-to-trans catalyst, zinc diacrylate may be selected as the crosslinking agent and is present in an amount of less than about 25 phr.

Accelerator(s)

It is to be understood that when elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

Antioxidant

Typically, antioxidants are included in conventional golf ball core compositions because antioxidants are included in the materials supplied by manufacturers of compounds used in golf ball cores. Without being bound to any particular theory, higher amounts of antioxidant in the reaction product may result in less trans-isomer content because the antioxidants consume at least a portion of the free radical source. Thus, even with high amounts of the free radical source in the reaction product described previously, such as for example about 3 phr, an amount of antioxidant greater than about 0.3 phr may significantly reduce the effective amount of free radicals that are actually available to assist in a cis-to-trans conversion.

Because it is believed that the presence of antioxidants in the composition may inhibit the ability of free radicals to adequately assist in the cis-to-trans conversion, one way to ensure sufficient amounts of free radicals are provided for the conversion is to increase the initial levels of free radicals present in the composition so that sufficient amounts of free radicals remain after interaction with antioxidants in the composition. Thus, the initial amount of free radicals provided in the composition may be increased by at least about 10 percent, and more preferably are increased by at least about 25 percent so that the effective amount of remaining free radicals sufficient to adequately provide the desired cis-to-trans conversion. Depending on the amount of antioxidant present in the composition, the initial amount of free radicals may be increased by at least 50 percent, 100 percent, or an even greater amount as needed. As discussed below, selection of the amount of free radicals in the composition may be determined based on a desired ratio of free radicals to antioxidant. Another approach is to reduce the levels of or eliminate antioxidants in the composition. For instance, the reaction product of the present invention may be substantially free of antioxidants, thereby achieving greater utilization of the free radicals toward the cis-to-trans conversion. As used herein, the term "substantially free" generally means that the polybutadiene reaction product includes less than about 0.3 phr of antioxidant, preferably less than about 0.1 phr of antioxidant, more preferably less than about 0.05 phr of antioxidant, and most preferably about 0.01 phr or less antioxidant.

The amount of antioxidant has been shown herein to have a relationship with the amount of trans-isomer content after conversion. For example, a polybutadiene reaction product with 0.5 phr of antioxidant cured at 335° F. for 11 minutes results in about 15 percent trans-isomer content at an exterior surface of the center and about 13.4 percent at an interior location after the conversion reaction. In contrast, the same polybutadiene reaction product substantially free of antioxidants results in about 32 percent trans-isomer content at an exterior surface and about 21.4 percent at an interior location after the conversion reaction.

In one embodiment, the ratio of the free radical source to antioxidant is greater than about 10. In another embodiment, the ratio of the free radical source to antioxidant is greater than about 25, preferably greater than about 50. In yet another embodiment, the free radical source-antioxidant ratio is about 100 or greater. In still another embodiment, the free radical source-antioxidant ratio is about 200 or greater, preferably 250 or greater, and more preferably about 300 or greater.

If the reaction product is substantially free of antioxidants, the amount of the free radical source is preferably about 3 phr or less. In one embodiment, the free radical source is present in an amount of about 2.5 phr or less, preferably about 2 phr or less. In yet another embodiment, the amount of the free radical source in the reaction product is about 1.5 phr or less, preferably about 1 phr or less. In still another embodiment, the free radical source is present is an amount of about 0.75 phr or less.

When the reaction product contains about 0.1 phr or greater antioxidant, the free radical source is preferably present in an amount of about 1 phr or greater. In one embodiment, when the reaction product has about 0.1 phr or greater antioxidant, the free radical source is present in an amount of about 2 phr or greater. In another embodiment, the free radical source is present in an amount of about 2.5 phr or greater when the antioxidant is present in an amount of about 0.1 phr or greater.

In one embodiment, when the reaction product contains greater than about 0.05 phr of antioxidant, the free radical source is preferably present in an amount of about 0.5 phr or greater. In another embodiment, when the reaction product has greater than about 0.05 phr of antioxidant, the free radical source is present in an amount of about 2 phr or greater. In yet another embodiment, the free radical source is present in an amount of about 2.5 phr or greater when the antioxidant is present in an amount of about 0.05 phr or greater.

Other Additives

Additional materials conventionally included in golf ball compositions may be added to the polybutadiene reaction product of the invention. These additional materials include, but are not limited to, density-adjusting fillers, coloring agents, reaction enhancers, crosslinking agents, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

For example, the fillers discussed above with respect to the polyurethane and polyurea compositions of the invention may be added to the polybutadiene reaction product to affect rheological and mixing properties, the specific gravity (i.e., density-modifying fillers), the modulus, the tear strength, reinforcement, and the like. Fillers may also be used to modify the weight of the core, e.g., a lower weight ball is preferred for a player having a low swing speed.

Trans-Isomer Conversion

As discussed above, it is preferable to increase cis-isomer to trans-isomer in polybutadiene core materials. In one embodiment, the amount of trans-isomer content after conversion is at least about 10 percent or greater, while in another it is about 12 percent or greater. In another embodiment, the amount of trans-isomer content is about 15 percent or greater after conversion. In yet another embodiment, the amount of trans-isomer content after conversion is about 20 percent or greater, and more preferably is about 25 percent or greater. In still another embodiment, the amount of trans-isomer content after conversion is about 30 percent or greater, and preferably is about 32 percent or greater. The amount of trans-isomer after conversion also may be about 35 percent or greater, about 38 percent or greater, or even about 40 percent or greater. In yet another embodiment, the amount of trans-isomer after conversion may be about 42 percent or greater, or even about 45 percent or greater.

The cured portion of the component including the reaction product of the invention may have a first amount of trans-isomer polybutadiene at an interior location and a second amount of trans-isomer polybutadiene at an exterior surface location. In one embodiment, the amount of trans-isomer at the exterior surface location is greater than the amount of trans-isomer at an interior location. As will be further illustrated by the examples provided herein, the difference in trans-isomer content between the exterior surface and the interior location after conversion may differ depending on the cure cycle and the ratios of materials used for the conversion reaction. For example, it is also possible that these differences can reflect a center with greater amounts of trans-isomer at the interior portion than at the exterior portion.

The exterior portion of the center may have amounts of trans-isomer after conversion in the amounts already indicated previously herein, such as in amounts about 10 percent or greater, about 12 percent or greater, about 15 percent or greater, and the like, up to and including amounts that are about 45 percent or greater as stated above. For example, in one embodiment of the invention, the polybutadiene reaction product may contain between about 35 percent to 60 percent of the trans-isomer at the exterior surface of a center portion. Another embodiment has from about 40 percent to 50 percent of trans-isomer at the exterior surface of a center portion. In one embodiment, the reaction product contains about 45 percent trans-isomer polybutadiene at the exterior surface of a center portion. In one embodiment, the reaction product at the center of the solid center portion may then contain at least about 20 percent less trans-isomer than is present at the exterior surface, preferably at least about 30 percent less trans-isomer, or at least about 40 percent less trans-isomer. In another embodiment, the amount of trans-isomer at the interior location is at least about 6 percent less than is present at the exterior surface, preferably at least about 10 percent less than the second amount.

The gradient between the interior portion of the center and the exterior portion of the center may vary. In one embodiment, the difference in trans-isomer content between the exterior and the interior after conversion is about 3 percent or greater, while in another embodiment the difference may be about 5 percent or greater. In another embodiment, the difference between the exterior surface and the interior location after conversion is about 10 percent or greater, and more preferably is about 20 percent or greater. In yet another embodiment, the difference in trans-isomer content between the exterior surface and the interior location after conversion may be about 5 percent or less, about 4 percent or less, and even about 3 percent or less. In yet another embodiment, the difference between the exterior surface and the interior location after conversion is less than about 1 percent.

Reaction Product Properties

The polybutadiene reaction product material preferably has a hardness of at least about 15 Shore A, more preferably between about 30 Shore A and 80 Shore D, and even more preferably between about 50 Shore A and 60 Shore D. In addition, the specific gravity is typically greater than about 0.7, preferably greater than about 1, for the golf ball polybutadiene material. Moreover, the polybutadiene reaction product preferably has a flexural modulus of from about 500 psi to 300,000 psi, preferably from about 2,000 to 200,000 psi.

The desired loss tangent in the polybutadiene reaction product should be less than about 0.15 at −60° C. and less than about 0.05 at 30° C. when measured at a frequency of 1 Hz and a 1 percent strain. In one embodiment, the polybutadiene reaction product material preferably has a loss tangent below about 0.1 at −50° C., and more preferably below about 0.07 at −50° C.

To produce golf balls having a desirable compressive stiffness, the dynamic stiffness of the polybutadiene reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

In one embodiment, the reaction product has a first dynamic stiffness measured at −50° C. that is less than about 130 percent of a second dynamic stiffness measured at 0° C. In another embodiment, the first dynamic stiffness is less than about 125 percent of the second dynamic stiffness. In yet another embodiment, the first dynamic stiffness is less than about 110 percent of the second dynamic stiffness.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. For example, the intermediate layer may be formed from any of the polyurethane, polyurea, and polybutadiene materials discussed above.

The intermediate layer may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof.

Ionomers

As briefly mentioned above, the intermediate layer may include ionomeric materials, such as ionic copolymers of ethylene and an unsaturated monocarboxylic acid, which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid totally or partially neutralized, i.e., from about 1 to about 100 percent, with salts of zinc, sodium, lithium, magnesium, potassium, calcium, manganese, nickel or the like. In one embodiment, the carboxylic acid groups are neutralized from about 10 percent to about 100 percent. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. In another embodiment, the acrylic or methacrylic acid is present in about 8 to 35 weight percent, more preferably 8 to 25 weight percent, and most preferably 8 to 20 weight percent.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers.

A low acid ionomer is believed to impart high spin. Thus, in one embodiment, the intermediate layer includes a low acid ionomer where the acid is present in about 10 to 15 weight percent and optionally includes a softening comonomer, e.g., iso- or n-butylacrylate, to produce a softer terpolymer. The softening comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

In another embodiment, the intermediate layer includes at least one high acid ionomer, for low spin rate and maximum distance. In this aspect, the acrylic or methacrylic acid is present in about 15 to about 35 weight percent, making the ionomer a high modulus ionomer. In one embodiment, the high modulus ionomer includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high modulus ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

In one embodiment, the intermediate layer may be formed from at least one polymer containing $\alpha,\beta$-unsaturated carboxylic acid groups, or the salts thereof, that have been 100 percent neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The acid moieties of the highly-neutralized polymers ("HNP"), typically ethylene-based ionomers, are preferably neutralized greater than about 70 percent, more preferably greater than about 90 percent, and most preferably at least about 100 percent. The HNP's may be also be blended with a second polymer component, which, if containing an acid group, may be neutralized in a conventional manner, by organic fatty acids, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

In this embodiment, the acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

Examples of these materials are disclosed in U.S. Patent Application Publication Nos. 2001/0018375 and 2001/0019971, which are incorporated herein in their entirety by express reference thereto.

The ionomer compositions may also include at least one grafted metallocene catalyzed polymers. Blends of this embodiment may include about 1 phr to about 100 phr of at least one grafted metallocene catalyzed polymer and about 99 phr to 0 phr of at least one ionomer, preferably from about 5 phr to about 90 phr of at least one grafted metallocene catalyzed polymer and about 95 phr to about 10 phr of at least one ionomer, more preferably from about 10 phr to about 75 phr of at least one grafted metallocene catalyzed polymer and about 90 phr to about 25 phr of at least one ionomer, and most preferably from about 10 phr to about 50 phr of at least one grafted metallocene catalyzed polymer and about 90 phr to about 50 phr of at least one ionomer. Where the layer is foamed, the grafted metallocene catalyzed polymer blends may be foamed during molding by any conventional foaming or blowing agent.

In addition, polyamides, discussed in more detail below, may also be blended with ionomers.

Non-Ionomeric Thermoplastic Materials

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. patent application Ser. No. 10/138,304, filed May 6, 2002, entitled "Golf Ball Incorporating Grafted Metallocene Catalyzed Polymer Blends," the entire disclosure of which is incorporated by reference herein.

In one embodiment, polyamide homopolymers, such as polyamide 6,18 and polyamide 6,36 are used alone, or in combination with other polyamide homopolymers. In another embodiment, polyamide copolymers, such as polyamide 6,10/6,36, are used alone, or in combination with other polyamide copolymers. Other examples of suitable polyamide homopolymers and copolymers include polyamide polyamide 4, polyamide 6, polyamide 7, polyamide 11, polyamide 12 (manufactured as Rilsan AMNO by Elf Atochem of Philadelphia, Pa.), polyamide 13, polyamide 4,6, polyamide 6,6, polyamide 6,9, polyamide 6,10, polyamide 6,12, polyamide 6,36, polyamide 12,12, polyamide 13,13, polyamide 6/6,6, polyamide 6,6/6,10, polyamide 6/6,T wherein T represents terephthalic acid, polyamide 6/6,6/6,10, polyamide 6,10/6,36, polyamide 66,6,18, polyamide 66,6,36, polyamide 6/6,18, polyamide 6/6,36, polyamide 6/6,10/6,18, polyamide 6/6,10/6,36, polyamide 6,10/6,18, polyamide 6,12/6,18, polyamide 6,12/6,36, polyamide 6/66,6/18, polyamide 6/66/6,36, polyamide 66/6,10/6,18, polyamide 66/6,10/6,36, polyamide 6/6,12/6,18, polyamide 6/6,12/6,36, and mixtures thereof.

As mentioned above, any of the above polyamide homopolymer, copolymer, and homopolymer/copolymer blends may be optionally blended with nonionomer polymers, such as nonionomer thermoplastic polymers, nonionomer thermoplastic copolymers, nonionomer TPEs, and mixtures thereof.

One specific example of a polyamide-nonionomer blend is a polyamide-metallocene catalyzed polymer blend. The blended compositions may include grafted and/or non-grafted metallocene catalyzed polymers. Grafted metallocene catalyzed polymers, functionalized with pendant groups, such as maleic anhydride, and the like, are available in experimental quantities from DuPont. Grafted metallocene catalyzed polymers may also be obtained by subjecting a commercially available non-grafted metallocene catalyzed polymer to a post-polymerization reaction involving a monomer and an organic peroxide to provide a grafted metallocene catalyzed polymer with the desired pendant group or groups.

Another example of a polyamide-nonionomer blend is a polyamide and non-ionic polymers produced using non-metallocene single-site catalysts. As used herein, the term "non-metallocene catalyst" or non-metallocene single-site catalyst" refers to a single-site catalyst other than a metallocene catalyst. Examples of suitable single-site catalyzed polymers are disclosed in co-pending U.S. patent application Ser. No. 09/677,871, of which the entire disclosure is incorporated by reference herein.

Nonionomers suitable for blending with the polyamide include, but are not limited to, block copoly(ester) copolymers, block copoly(amide) copolymers, block copoly(urethane) copolymers, styrene-based block copolymers, thermoplastic and elastomer blends wherein the elastomer is not vulcanized (TEB), and thermoplastic and elastomer or rubber blends wherein the elastomer is dynamically vulcanized (TED). Other nonionomers suitable for blending with polyamide to form an intermediate layer composition include, but are not limited to, polycarbonate, polyphenylene oxide, imidized, amino group containing polymers, high impact polystyrene (HIPS), polyether ketone, polysulfone, poly(phenylene sulfide), reinforced engineering plastics, acrylic-styrene-acrylonitrile, poly(tetrafluoroethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(4-dodecylstyrene), poly(4-tetradecylstyrene), poly(ethylene oxide), poly(oxymethylene), poly(silazane), poly(furan tetracarboxylic acid diimide), poly(acrylonitrile), poly("-methylstyrene), as well as the classes of polymers to which they belong and their copolymers, including functional comonomers, and blends thereof.

In one embodiment, the non-ionomeric materials have a hardness of about 60 Shore D or greater and a flexural modulus of about 30,000 psi or greater.

Resilient Polymer—Reinforcing Polymer Blend

The intermediate layer may include a resilient polymer component, which is preferably used as the majority of polymer in the intermediate layer to impart resilience in the cured state, and a reinforcing polymer component as a blend.

Resilient polymers suitable for use in the intermediate layer include polybutadiene, polyisoprene, styrene-butadiene, styrene-propylene-diene rubber, ethylene-propylene-diene (EPDM), mixtures thereof, and the like, preferably having a high molecular weight of at least about 50,000 to about 1,000,000. In one embodiment, the molecular weight is from about 250,000 to about 750,000, and more preferably from about 200,000 to about 400,000.

The reinforcing polymer component preferably has a glass transition temperature ($T_G$) sufficiently low to permit mixing without initiating crosslinking, preferably between about 35° C. to 120° C. In addition, the reinforcing polymer component preferably has a sufficiently low viscosity at the mixing temperature when mixed with the resilient polymer component to permit proper mixing of the two polymer components. The weight of the reinforcing polymer relative to the total composition for forming the intermediate layer generally ranges from about 5 to 25 weight percent, preferably about 10 to 20 weight percent.

Examples of polymers suitable for use in the reinforcing polymer component include trans-polyisoprene, block copolymer ether/ester, acrylic polyol, a polyethylene, a polyethylene copolymer, 1,2-polybutadiene (syndiotactic), ethylene-vinyl acetate copolymer, trans-polycyclooctenenamer, trans-isomer polybutadiene, and mixtures thereof. Particularly suitable reinforcing polymers include: HYTREL 3078, a block copolymer ether/ester commercially available from DuPont of Wilmington, Del.; a trans-isomer polybutadiene, such as FUREN 88 obtained from Asahi Chemicals of Yako, Kawasakiku, Kawasakishi, Japan; KURRARAY TP251, a trans-polyisoprene commercially available from KURRARAY CO.; LEVAPREN 700HV, an ethylene-vinyl acetate copolymer commercially available from Bayer-Rubber Division, Akron, Ohio; and VESTENAMER 8012, a trans-polycyclooctenenamer commercially available from Huls America Inc. of Tallmadge, Ohio. Some suitable reinforcing polymer components are listed in Table 1 below with their crystalline melt temperature ($T_C$) and/or $T_G$.

TABLE 1

REINFORCING POLYMER COMPONENTS

| Polymer Type | Tradename | $T_C$ (° C.) | $T_G$ (° C.) |
|---|---|---|---|
| Trans-polyisoprene | KURRARAY TP251 | 60 | −59 |
| Trans-polybutadiene | FUREN 88 | 84 | −88 |
| Polyethylene | Dow LPDE | 98 | −25 |
| Trans-polycyclo octenenamer | VESTENAMER 8012 | 54 | |

Another polymer particularly suitable for use in the reinforcing polymer component is a rigidifying polybutadiene component, which typically includes at least about 80 percent trans-isomer content with the rest being cis-isomer 1,4-polybutadiene and vinyl-isomer 1,2-polybutadiene. Thus, it may be referred to herein as a "high trans-isomer polybutadiene" or a "rigidifying polybutadiene" to distinguish it from the cis-isomer polybutadienes or polybutadienes having a low trans-isomer content, i.e., typically below 80 percent, used to form the golf ball cores of the invention. The vinyl-content of the rigidifying polybutadiene component is preferably present in no more than about 15 percent, preferably less than about 10 percent, more preferably less than about 5 percent, and most preferably less than about 3 percent of the polybutadiene isomers.

The rigidifying polybutadiene component, when used in a golf ball of the invention, preferably has a polydispersity of no greater than about 4, preferably no greater than about 3, and more preferably no greater than about 2.5. The polydispersity, or PDI, is a ratio of the molecular weight average ($M_w$) over the molecular number average ($M_n$) of a polymer.

In addition, the rigidifying polybutadiene component, when used in a golf ball of the invention, typically has a high absolute molecular weight average, defined as being at least about 100,000, preferably from about 200,000 to 1,000,000. In one embodiment, the absolute molecular weight average is from about 230,000 to 750,000. In another embodiment, the molecular weight is about 275,000 to 700,000. In any embodiment where the vinyl-content is present in greater than about 10 percent, the absolute molecular weight average is preferably greater than about 200,000.

When trans-polyisoprene or high trans-isomer polybutadiene is included in the reinforcing polymer component, it may be present in an amount of about 10 to 40 weight percent, preferably about 15 to 30 weight percent, more preferably about 15 to no more than 25 weight percent of the polymer blend, i.e., the resilient and reinforcing polymer components.

The same crosslinking agents mentioned above with regard to the core may be used in this embodiment to achieve the desired elastic modulus for the resilient polymer—reinforcing polymer blend. In one embodiment, the crosslinking agent is added in an amount from about 1 to about 50 parts per hundred of the polymer blend, preferably about 20 to about 45 parts per hundred, and more preferably about 30 to about 40 parts per hundred, of the polymer blend.

The resilient polymer component, reinforcing polymer component, free-radical initiator, and any other materials used in forming an intermediate layer of a golf ball core in accordance with invention may be combined by any type of mixing known to one of ordinary skill in the art.

The intermediate layer may also be formed from the compositions as disclosed in U.S. Pat. No. 5,688,191, the entire disclosure of which is incorporated by reference herein, which are listed in Table 2 below.

TABLE 2

INTERMEDIATE LAYER COMPOSITIONS AND PROPERTIES

| | Sample | Hardness (Shore D) | Resilience | Flex Modulus (psi) | Tensile Modulus (psi) | % Strain at Break |
|---|---|---|---|---|---|---|
| 1A | 0% Estane 58091<br>100% Estane 58861 | 28 | 54 | 1,720 | 756 | 563 |
| 1B | 25% Estane 58091<br>75% Estane 58861 | 34 | 41 | 2,610 | 2,438 | 626 |
| 1C | 50% Estane 58091<br>50% Estane 58861 | 44 | 31 | 10,360 | 10,824 | 339 |
| 1D | 75% Estane 58091<br>25% Estane 58861 | 61 | 34 | 43,030 | 69,918 | 149 |
| 1E | 100% Estane 58091<br>0% Estane 58861 | 78 | 46 | 147,240 | 211,288 | 10 |

TABLE 2-continued

INTERMEDIATE LAYER COMPOSITIONS AND PROPERTIES

| Sample | | Hardness (Shore D) | Resilience | Flex Modulus (psi) | Tensile Modulus (psi) | % Strain at Break |
|---|---|---|---|---|---|---|
| 2A | 0% Hytrel 5556<br>100% Hytrel 4078 | 40 | 47 | 8,500 | 7,071 | 527 |
| 2B | 25% Hytrel 5556<br>75% Hytrel 4078 | 43 | 51 | 10,020 | 9,726 | 441 |
| 2C | 50% Hytrel 5556<br>50% Hytrel 4078 | 45 | 47 | 12,280 | 10,741 | 399 |
| 2D | 75% Hytrel 5556<br>25% Hytrel 4078 | 48 | 53 | 13,680 | 13,164 | 374 |
| 2E | 100% Hytrel 5556<br>0% Hytrel 4078 | 48 | 52 | 12,110 | 15,231 | 347 |
| 3A | 0% Hytrel 5556<br>100% Hytrel 3078 | 30 | 62 | 3,240 | 2,078 | 810 no break |
| 3B | 25% Hytrel 5556<br>75% Hytrel 3078 | 37 | 59 | 8,170 | 5,122 | 685 |
| 3C | 50% Hytrel 5556<br>50% Hytrel 3078 | 44 | 55 | 15,320 | 10,879 | 590 |
| 3D | 75% Hytrel 5556<br>25% Hytrel 3078 | 53 | 50 | 19,870 | 16,612 | 580 |
| 3E | 100% Hytrel 5556<br>0% Hytrel 3078 | 58 | 50 | 54,840 | 17,531 | 575 |
| 4A | 0% Hytrel 4078<br>100% Pebax 4033 | 46 | 51 | 11,150 | 8,061 | 597 |
| 4B | 25% Hytrel 4078<br>75% Pebax 4033 | 46 | 53 | 10,360 | 7,769 | 644 |
| 4C | 50% Hytrel 4078<br>50% Pebax 4033 | 45 | 52 | 9,780 | 8,117 | 564 |
| 4D | 75% Hytrel 4078<br>25% Pebax 4033 | 42 | 53 | 9,310 | 7,996 | 660 |
| 4E | 100% Hytrel 3078<br>0% Pebax 4033 | 40 | 51 | 9,250 | 6,383 | 531 |
| 5A | 0% Hytrel 3078<br>100% Estane 58091 | 77 | 50 | 156,070 | 182,869 | 9 |
| 5B | 25% Hytrel 3078<br>75% Estane 58091 | 65 | 48 | 87,680 | 96,543 | 33 |
| 5C | 50% Hytrel 3078<br>50% Estane 58091 | 52 | 49 | 53,940 | 48,941 | 102 |
| 5D | 75% Hytrel 3078<br>25% Estane 58091 | 35 | 54 | 12,040 | 6,071 | 852 |
| 5E | 100% Hytrel 3078<br>0% Estane 58091 | 29 | 50 | 3,240 | 2,078 | 810 no break |
| 6A | 100% Kraton 1921<br>0% Estane 58091<br>0% Surlyn 7940 | 29 | 59 | 24,300 | 29,331 | 515 |
| 6B | 50% Kraton 1921<br>50% Estane 58091<br>0% Surlyn 7940 | 57 | 49 | 56,580 | — | 145 |
| 6C | 50% Kraton 1921<br>0% Estane 58091<br>50% Surlyn 7940 | 56 | 55 | 28,290 | 28,760 | 295 |
| 7A | 33.3% Pebax 4033<br>33.3% Estane 58091<br>33.3% Hytrel 3078 | 48 | 50 | 41,240 | 30,032 | 294 |
| 7B | 30% Pebax 4033<br>40% Estane 58091<br>10% Hytrel 3078 | 48 | 50 | 30,650 | 14,220 | 566 |
| 7C | 20% Pebax 4033<br>40% Estane 58091<br>40% Hytrel 3078 | 41 | 54 | 24,020 | 16,630 | 512 |

Other Additives

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

Golf Ball Cover(s)

The cover provides the interface between the ball and a club. Properties that are desirable for the cover are good moldability, high abrasion resistance, high tear strength, high resilience, and good mold release, among others.

In one embodiment, at least one cover layer includes about 1 percent to about 100 percent of the polyurethane composition of the invention. In particular, the cover may be formed from the reaction product of an isocyanate and a polyol, which is cured with a hydroxy-terminated or amine-terminated curing agent. In one embodiment, the cover layer is formed with a composition including a saturated isocyanate, a saturated polyol, and a modified curative blend, which includes a curing agent and a freezing point depressing agent.

In addition, polyurea compositions of the invention may be used to form at least one cover layer of a golf ball of the present invention. For example, the cover layer may be formed with the reaction product of an isocyanate and a polyamine, which is cured with a modified curative blend formed from a curing agent and a freezing point depressing agent. In one embodiment, the cover layer(s) may be formed from the reaction product of an saturated isocyanate and a saturated polyether amine, which is cured with a modified curative blend preferably including an amine-terminated curing agent and an amine-terminated freezing point depressing agent.

The cover layer(s) may also be formed from composition blends as discussed above. For example, in one embodiment, at least one cover layer is formed from a blend of about 10 percent to about 90 percent polyurethane, preferably saturated, and about 90 percent to about 10 percent other polymers and/or other materials. In another embodiment, at least one cover layer is formed from a blend of about 10 percent to about 90 percent polyurea, preferably saturated, and about 90 percent to about 10 percent other polymers and/or other materials. In yet another embodiment, the cover compositions include from about 10 percent to about 75 percent polyurethane or polyurea and about 90 percent to about 25 percent other polymers and/or other materials, such as those listed above.

Golf ball covers may also be formed of one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid, and copolymers and homopolymers produced using a single-site catalyst;

(3) Polyurethanes, thermoplastic or thermoset, saturated or unsaturated, aliphatic or aromatic, acid functionalized, such as those prepared from polyols or amines and diisocyanates or polyisocyanates and those disclosed in U.S. Pat. No. 5,334,673 and U.S. patent application Ser. No. 10/072,395;

(4) Polyureas, thermoplastic or thermoset, saturated or unsaturated, aliphatic or aromatic, acid functionalized, such as those disclosed in U.S. Pat. No. 5,484,870 and U.S. patent application Ser. No. 10/072,395;

(5) Polyamides, such as poly(hexamethylene adipamide) and others prepared from diamines and dibasic acids, as well as those from amino acids such as poly(caprolactam), reinforced polyamides, and blends of polyamides with ionomers, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Ethylene, propylene, 1-butene or 1-hexane based homopolymers or copolymers including functional monomers, such as acrylic and methacrylic acid or fully or partially neutralized ionomer resins, and their blends, methyl acrylate, methyl methacrylate homopolymers and copolymers, low acid ionomers, high acid ionomers, and blends thereof;

(11) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(12) Blends of thermoplastic rubbers with polyethylene, propylene, polyacetal, nylon, polyesters, cellulose esters, and the like.

The cover may also be at least partially formed from the polybutadiene reaction product discussed above with respect to the core.

As discussed elsewhere herein, the composition may be molded onto the golf ball in any known manner, such as by casting, compression molding, injection molding, reaction injection molding, or the like. One skilled in the art would appreciate that the molding method used may be determined at least partially by the properties of the composition. For example, casting may be preferred when the material is thermoset, whereas compression molding or injection molding may be preferred for thermoplastic compositions.

Golf Ball Construction

The compositions of the present invention may be used with any type of ball construction. For example, the ball may have a one-piece, two-piece, or three-piece design, a double core, a double cover, an intermediate layer(s), a multi-layer core, and/or a multi-layer cover depending on the type of performance desired of the ball. As used herein, the term "multilayer" means at least two layers. For example, the compositions of the invention may be used in a core, intermediate layer, and/or cover of a golf ball, each of which may have a single layer or multiple layers.

As described above in the core section, a core may be a one-piece core or a multilayer core, both of which may be solid, semi-solid, hollow, fluid-filled, or powder-filled. A multilayer core is one that has an innermost component with an additional core layer or additional core layers disposed thereon. For example, FIG. 1 shows a golf ball 1 having a core 2 and a cover 3. In one embodiment, the golf ball of FIG. 1 represents a core 2 of polybutadiene reaction material or other conventional materials and a cover 3 including the polyurethane composition of the invention. In another embodiment, the golf ball of FIG. 1 represents a core 2 formed from polybutadiene reaction material and a cover 3 including the polyurea composition of the invention. As discussed above, the both the polyurethane and polyurea compositions are preferably saturated.

In addition, when the golf ball of the present invention includes an intermediate layer, such as an inner cover layer or outer core layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the intermediate layer may also include a plurality of layers. It will be appreciated that any number or type of intermediate layers may be used, as desired.

Figure 2:
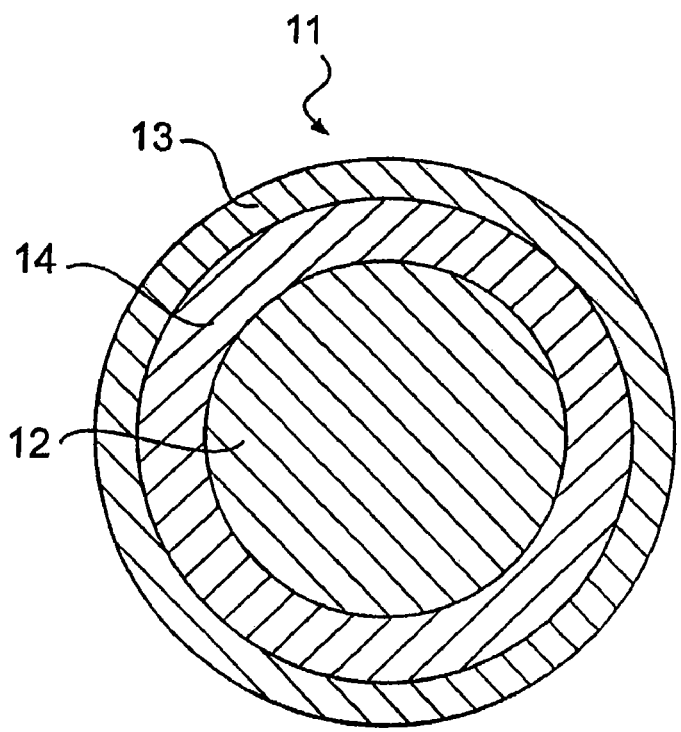
FIG. 2 is a cross-sectional view of a multi-component golf ball, wherein at least the cover is formed from the polyurethane or polyurea compositions of the invention.
Figure 3:
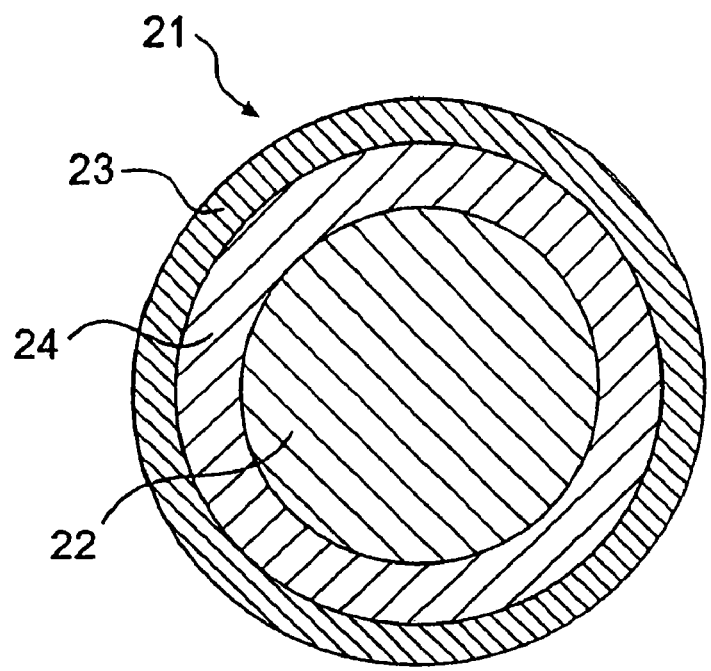
FIG. 3 is a cross-sectional view of a multi-component golf ball, wherein the cover is formed from the polyurethane or polyurea compositions of the invention and the intermediate layer is formed from a composition including at least one ionomer resin.

FIG. 2 illustrates a multilayer golf ball 11, including a cover 13, at least one intermediate layer 14, and a core 12. In one embodiment, the golf ball 11 of FIG. 2 may include a core 12 of polybutadiene reaction material, an intermediate layer 14, and a cover 13 formed of the polyurethane composition of the invention, wherein the polyurethane is preferably saturated. In another embodiment, the cover 13 in the golf ball of FIG. 2 may be formed from a polyurea composition of the invention. In addition, the golf ball 21 of FIG. 3 has a core 22 of polybutadiene reaction material or other conventional core materials, at least one ionomer intermediate layer 24, and cover 23 including the saturated polyurethane or saturated polyurea compositions of the invention.

Figure 4:
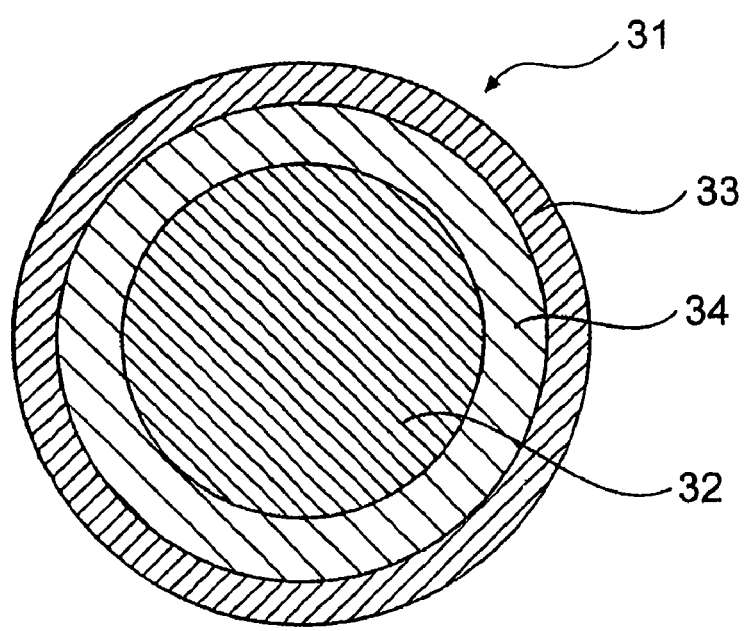
FIG. 4 is a cross-sectional view of a multi-component golf ball including a core and a cover, wherein the core is surrounded by a tensioned elastomeric material and the cover is formed from the polyurethane or polyurea compositions of the invention.
Figure 5:
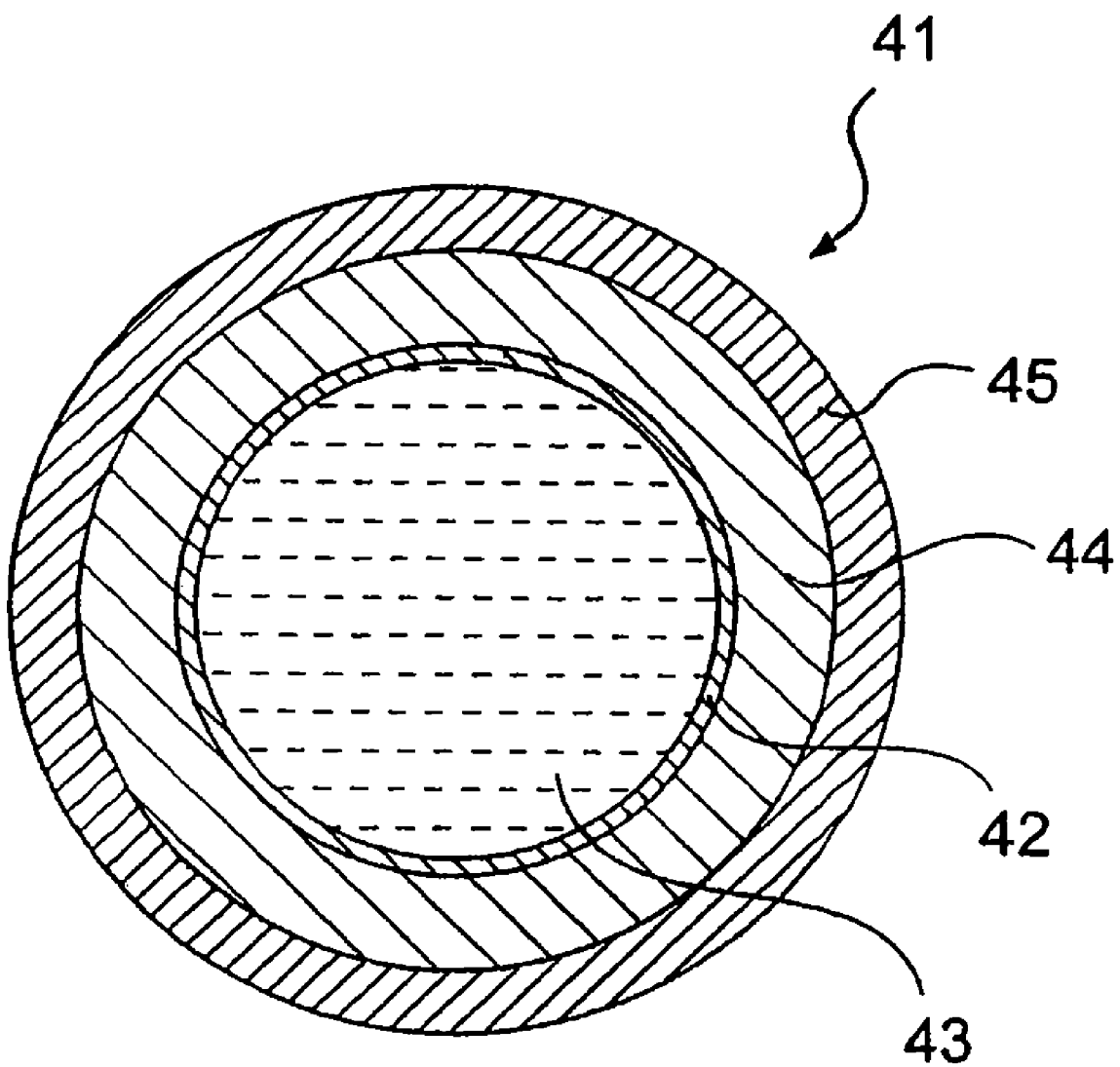
FIG. 5 is a cross-sectional view of a liquid center golf ball wherein the liquid core is surrounded by a tensioned elastomeric material and the cover is formed from the polyurethane or polyurea compositions of the invention.

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball 31 of FIG. 4 may include a core layer 32, a tensioned elastomeric layer 34 wound thereon, and a cover layer 33. In particular, the golf ball 31 of FIG. 4 may have a core 32 made of a polybutadiene reaction product, an intermediate layer including a tensioned elastomeric material 34 and cover 33 including the polyurethane or polyurea compositions of the invention. The tensioned elastomeric material may be formed of any suitable material known to those of ordinary skill in the art. In yet another embodiment, the wound, liquid center golf ball 41 of FIG. 5 has a hollow spherical core shell 42 with its hollow interior filled with a liquid 43, a thread rubber layer including a tensioned elastomeric material 44 and a cover 45 formed from the polyurethane or polyurea compositions of the invention.

In one embodiment, the tensioned elastomeric material incorporates the polybutadiene reaction product discussed above. The tensioned elastomeric material may also be formed conventional polyisoprene. In another embodiment, the polyurea composition of the invention is used to form the tensioned elastomeric material. In another embodiment, solvent spun polyether urea, as disclosed in U.S. Pat. No. 6,149, 535, which is incorporated in its entirety by reference herein, is used to form the tensioned elastomeric material in an effort to achieve a smaller cross-sectional area with multiple strands.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover.

At least one intermediate layer may also be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a polybutadiene reaction product with fluorine gas. In one embodiment, the moisture barrier layer has a water vapor transmission rate that is sufficiently low to reduce the loss of COR of the golf ball by at least 5 percent if the ball is stored at 100° F. and 70 percent relative humidity for six weeks as compared to the loss in COR of a golf ball that does not include the moisture barrier, has the same type of core and cover, and is stored under substantially identical conditions.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, which is incorporated by reference in its entirety.

Figure 6:
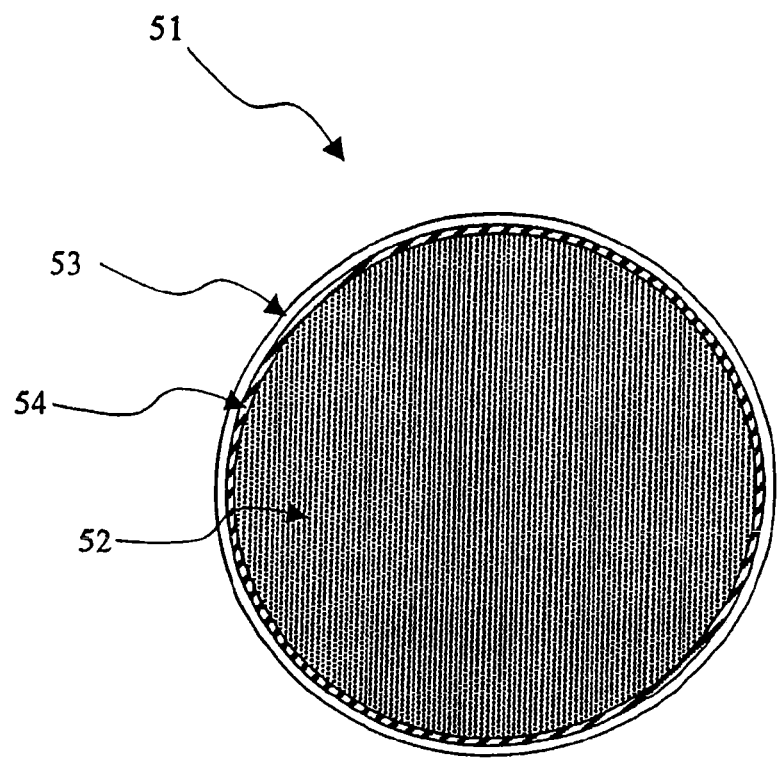
FIG. 6 is a cross-sectional view of a multi-component golf ball including a core, a thin inner cover layer, and a thin outer cover layer disposed thereon, wherein the cover is formed from the polyurethane or polyurea compositions of the invention.
Figure 7:
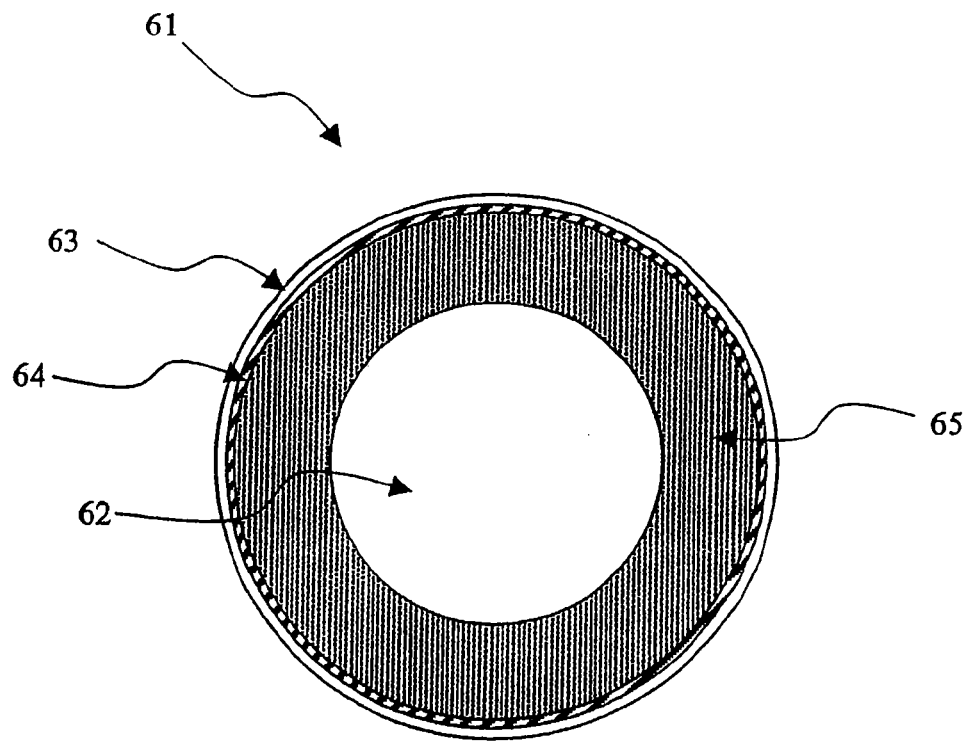
FIG. 7 is a cross-sectional view of a multi-component golf ball including a core, an outer core layer, a thin inner cover layer, and a thin outer cover layer disposed thereon, wherein the cover is formed from the polyurethane or polyurea compositions of the invention.
Figure 8:
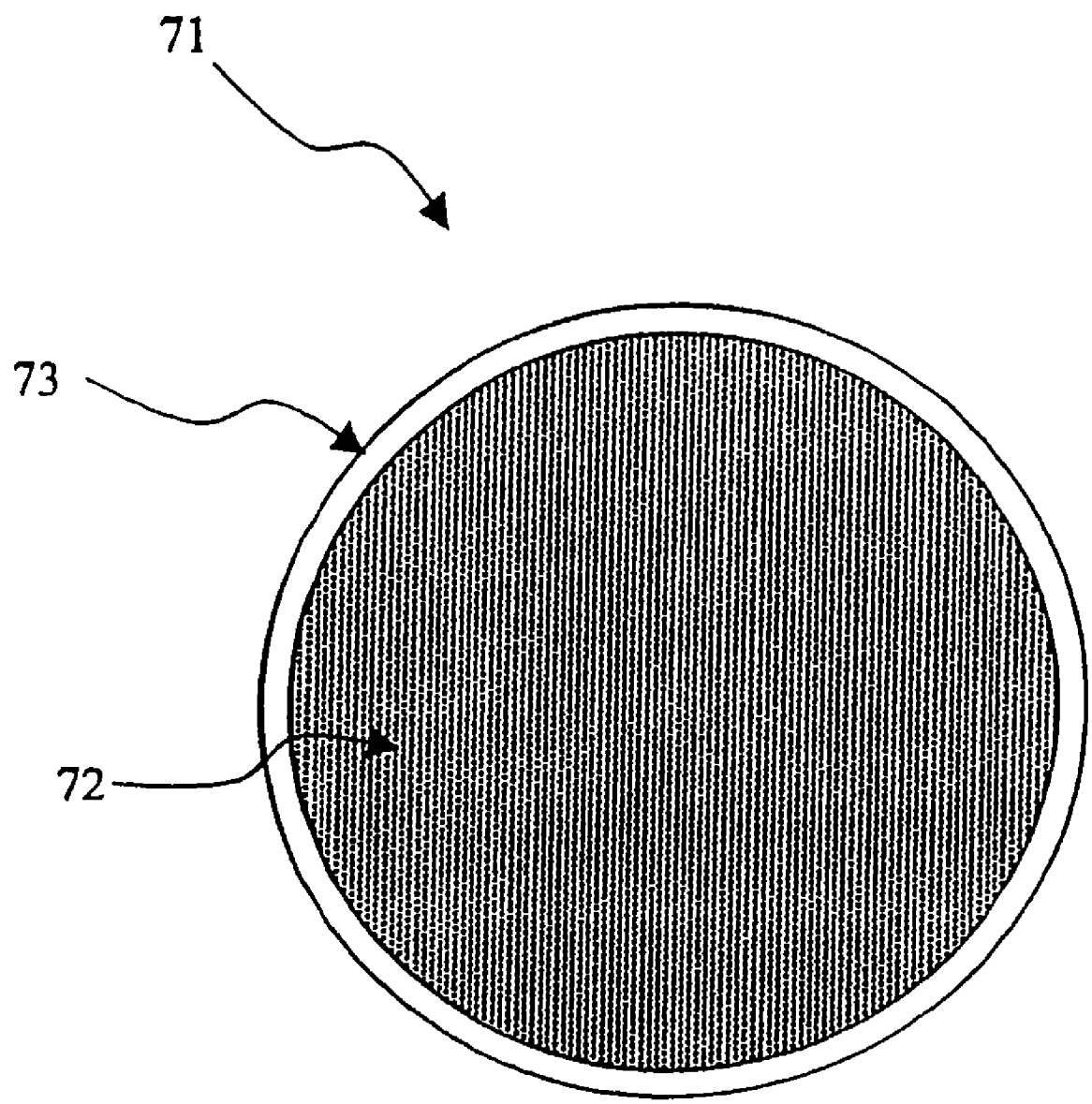
FIG. 8 is a cross-sectional view of a multi-component golf ball including a large core and a thin outer cover layer disposed thereon, wherein the cover is formed from the polyurethane or polyurea compositions of the invention.

Likewise, the cover may include a plurality of layers, e.g., an inner cover layer disposed about a golf ball center and an outer cover layer formed thereon. For example, FIG. 6 may represent a golf ball 51 having a core 52, a thin inner cover layer 54, and a thin outer cover layer 53 disposed thereon. In particular, the core 51 may be formed of a polybutadiene reaction material, the inner cover layer 54 formed of an ionomer blend, and the outer cover layer 53 formed of the polyurethane or polyurea compositions of the invention. In addition, FIG. 7 may represent a golf ball 61 having a core 62, an outer core layer 65, a thin inner cover layer 64, and a thin outer cover layer 63 disposed thereon. In one embodiment, the core 62 and the outer core layer 65 are formed of the polybutadiene reaction material but differ in hardness, the inner cover layer 64 is formed of an ionomer blend, and the outer cover layer 63 is formed of the polyurethane or polyurea compositions of the invention. Furthermore, the compositions of the invention may be used to form a golf ball 71, shown in FIG. 8, having a large core 72 and a thin outer cover layer 73. In one embodiment, the large core 72 is formed of a polybutadiene reaction material and the thin outer cover layer 73 is formed of the polyurethane or polyurea compositions of the invention, preferably acid functionalized, wherein the acid groups are at least partially neutralized.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. Certain polyureas may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layer vary by about 3° or greater. In yet another embodiment, the contact angles of the cover layers vary by about 5° or greater.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784, 5,484,870, and, the disclosures of which are incorporated herein by reference in their entirety.

Forming the Core Layer(s)

The cores of the invention may be formed by any suitable method known to those of ordinary skill in art. When the cores are formed from a thermoset material, compression molded is a particularly suitable method of forming the core. In a thermoplastic core embodiment, on the other hand, the cores may be injection molded.

For example, methods of converting the cis-isomer of the polybutadiene resilient polymer core component to the trans-isomer during a molding cycle are known to those of ordinary skill in the art. Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to those of ordinary skill in the art, and such equipment may include a Banbury mixer, a two-roll mill, or a twin screw extruder. Suitable mixing speeds and temperatures are well-known to those of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 to about 18 minutes, preferably from about 8 to about 15 minutes, and more preferably from about 10 to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. Those of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The disclosures of these patents are hereby incorporated by reference in their entirety.

Forming the Intermediate Layer(s)

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

Forming the Cover Layer(s)

The polyurethane and polyurea compositions of the invention may be applied over an inner ball using a variety of application techniques such as spraying, compression molding, dipping, spin coating, or flow coating methods that are well known in the art. In one embodiment, the polyurethane or polyurea composition is used to form a cover over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a useful method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions of the invention may also be used employing the same casting process.

For example, once either of the polyurethane or polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281.

In one embodiment of the present invention, the golf ball has an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. In another embodiment, the ball has five different sizes of dimples in total. The sides of the large triangle have four different sizes of dimples and the small triangles have two different sizes of dimples.

In another embodiment of the present invention, the golf ball has an icosahedron dimple pattern with a large triangle including three different dimples and the small triangles having only one diameter of dimple. In a preferred embodiment, there are 392 dimples and one great circle that does not intersect any dimples. In another embodiment, more than five alternative dimple diameters are used.

In one embodiment of the present invention, the golf ball has an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. In this embodiment, the ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078, 417, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in co-pending U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S. patent application Ser. No. 09/404,164, filed Sep. 27, 1999, entitled "Golf Ball Dimple Patterns," and U.S. Pat. No. 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-Processing

The golf balls of the present invention may be painted, coated, or surface treated for further benefits.

For example, golf balls covers frequently contain a fluorescent material and/or a dye or pigment to achieve the desired color characteristics. A golf ball of the invention may also be treated with a base resin paint composition, however, as disclosed in U.S. Patent Publication No. 2002/0082358, which includes a 7-triazinylamino-3-phenylcoumarin derivative as the fluorescent whitening agent to provide improved weather resistance and brightness.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. patent application Ser. No. 10/012,538, filed Dec. 12, 2001, entitled, "Method of Forming Indicia on a Golf Ball," the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. patent application Ser. No. 09/739,469, filed Dec. 18, 2002, entitled "Laser Marking of Golf Balls," which is incorporated in its entirety by reference herein.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

The use of the saturated polyurea and polyurethane compositions in golf equipment obviates the need for typical post-processing, e.g., coating a golf ball with a pigmented coating prior to applying a clear topcoat to the ball. Unlike compositions with no light stable properties, the compositions used in forming the golf equipment of the present invention do not discolor upon exposure, especially related or extended exposure, to light. Also, by eliminating at least one coating step, the manufacturer realizes economic benefits in terms of reduced process times and consequent improved labor efficiency. Further, significant reduction in volatile organic compounds ("VOCs"), typical constituents of paint, may be realized through the use of the present invention, offering significant environmental benefits.

Thus, while it is not necessary to use pigmented coating on the golf balls of the present invention when formed with the saturated compositions, the golf balls of the present invention may be painted, coated, or surface treated for further benefits. For example, the value of golf balls made according to the invention and painted offer enhanced color stability as degradation of the surface paint occurs during the normal course of play. The mainstream technique used nowadays for highlighting whiteness is to form a cover toned white with titanium dioxide, subjecting the cover to such surface treatment as corona treatment, plasma treatment, UV treatment, flame treatment, or electron beam treatment, and applying one or more layers of clear paint, which may contain a fluorescent whitening agent. This technique is productive and cost effective.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

When a polybutadiene reaction product is incorporated into a core, the core may have a hardness gradient, i.e., a first hardness at a first point, i.e., at an interior location, and a second hardness at a second point, i.e., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C. In one golf ball formulated according to the invention, the first hardness was about 51 Shore C and a second hardness was about 71 Shore C, providing a hardness difference of greater than 20 percent.

In one embodiment, however, the core has a substantially uniform hardness throughout. Thus, in this aspect, the first and second hardness preferably differ by about 5 percent or less, more preferably about 3 percent or less, and even more preferably by about 2 percent or less. In another embodiment, the hardness is uniform throughout the component.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 60 Shore D. In one embodiment, the cover has a hardness of about 40 Shore D to about 65 Shore D. In another embodiment, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge. In an embodiment where the core is hard, the compression may be about 90 or greater. In one embodiment, the compression of the hard core ranges from about 90 to about 100.

The core of the present invention may also have a Soft Center Deflection Index (SCDI) compression of less than about 160, more preferably, between about 40 and about 160, and most preferably, between about 60 and about 120.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.7 to about 0.85. In one embodiment, the COR is about 0.75 or greater, preferably about 0.78 or greater. In another embodiment, the ball has a COR of about 0.8 or greater.

In addition, the inner ball preferably has a COR of about 0.780 or more. In one embodiment, the COR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural moduli of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer including the polyurethane or polyurea compositions of the invention is preferably at least about 0.7.

Adhesion Strength

The adhesion, or peel, strength of the polyurethane and polyurea compositions of the invention is preferably about 5 lb$_f$/in or greater. In one embodiment, the adhesion strength is about 25 lb$_f$/in or less. For example, the adhesion strength is preferably about 10 lb$_f$/in or more and about 20 lb$_f$/in or less. In another embodiment, the adhesion strength is about 20 lb$_f$/in or greater, preferably about 24 lb$_f$/in or greater. In yet another embodiment, the adhesion strength is about 26 lb$_f$/in or greater. In still another embodiment, the adhesion strength is about 20 lb$_f$/in to about 30 lb$_f$/in.

Shear/Cut Resistance

The cut resistance of a golf ball cover may be determined using a shear test having a scale from 1 to 9 assessing damage and appearance. In one embodiment, the damage rank is preferably about 3 or less, more preferably about 2 or less. In another embodiment, the damage rank is about 1 or less. The appearance rank of a golf ball of the invention is preferably about 3 or less. In one embodiment, the appearance rank is about 2 or less, preferably about 1 or less.

Light Stability

As discussed above, the compositions of the invention may be inherently light stable, i.e., include no aromatic components The light stability of the cover may be quantified by the difference in yellowness index (*Y1), i.e., yellowness measured after a predetermined exposure time—yellowness before exposure. In one embodiment, the *Y1 is about 10 or less after 5 days (120 hours) of exposure, preferably about 6 or less after 5 days of exposure, and more preferably about 4 or less after 5 days of exposure. In one embodiment, the *Y1 is about 2 or less after 5 days of exposure, and more preferably about 1 or less after 5 days of exposure.

The difference in the b chroma dimension (*b*, yellow to blue) is also a way to quantify the light stability of the cover. In one embodiment, the *b* is about 4 or less after 5 days (120 hours) of exposure, preferably about 3 or less after 5 days of exposure, and more preferably about 2 or less after 5 days of exposure. In one embodiment, the *b* is about 1 or less after 5 days of exposure.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Examples 1-2

Saturated Polyurethane Golf Ball Cover

Table 3 illustrates the components used to make a saturated polyurethane golf ball cover composition.

TABLE 3

SATURATED POLYURETHANE COMPOSITIONS

| Chemicals | Example 1 Weight (g) | Example 2 Weight (g) |
|---|---|---|
| IPDI Prepolymer* | 458.73 | |
| $H_{12}$MDI Prepolymer** | | 458.73 |
| 1,4-Butanediol | 42.75 | 42.75 |
| HCC-19584 Color Dispersion*** | 17.55 | 17.55 |

*Prepolymer is the reaction product of isophorone diisocyanate and polytetramethylene ether glycol.
**Prepolymer is the reaction product of 4,4'-dicyclohexylmethane diisocyanate and polytetramethylene ether glycol.
***HCC-19584 is a white-blue color dispersion manufactured by Harwick Chemical Corporation A golf ball was made having the cover formulated from the compositions above following the teachings of U.S. Pat. No. 5,733,428. The physical properties and the ball performance results are listed in Table 4.

TABLE 4

PHYSICAL PROPERTIES

| Physical Properties | Example 1 | Example 2 |
|---|---|---|
| Cover Hardness | 68 | 54 |
| Weight (g) | 45.20 | 45.58 |
| Compression | 103 | 89 |
| Shear Resistance | Good | Good |
| Color Stability | Comparable to SURLYN ® | Comparable to SURLYN ® |

The molded balls from the above Example 2 composition listed in Table 3 were further subject to a QUV test as described below:

Method:

ASTM G 53-88 "Standard Practice for Operating Light and Water-Exposure Apparatus (Fluorescent UV-Condensation Type) for Exposure of Nonmetallic Materials" was followed with certain modifications as described below:

Six balls of each variety under evaluation were placed in custom made golf ball holders and inserted into the sample rack of a Q-PANEL model OUV/SER Accelerated Weathering Tester manufactured by Q-Panel Lab Products of Cleveland, Ohio. The sample holders were constructed such that each ball was approximately 1.75 inches from a UVA-340 bulb, at its closest point. The weathering tester was then cycled every four hours between the following two sets of conditions (for the specified total length of time 24, 48, and 120 hours):

Condition #1: water bath temperature of about 50° C. with the UV lamps on, set and controlled at an irradiance power of 1.00 W/m²/nm.

Condition #2: water bath temperature of about 40° C. with the UV lamps turned off.

Color was measured before weathering and after each time cycle using a BYK-Gardner Model TCS II sphere type Spectrophotometer equipped with a 25 mm port. A D65/10° illumination was used in the specular reflectance included mode.

The test results for the molded balls after 24 hours of UV exposure are tabulated in Table 5, wherein ΔL* equals the difference in L dimension (light to dark), Δa* equals the difference in the a chroma dimension (red to green), Δb* equals the difference in the b chroma dimension (yellow to blue), ΔC* equals the combined chroma difference (a* and b* scales), hue and saturation, ΔH* equals the total hue difference, excluding effects of saturation and luminescence, ΔE* equals the total color difference, ΔW1 equals the difference in the whiteness index, and ΔY1 and the difference in the yellowness index.

TABLE 5

UV STABILITY DATA

| Sample | ΔL* | Δa* | Δb* | ΔC* | ΔH* | ΔE*ab | ΔW1 (E313) | ΔY1 (D1925) |
|---|---|---|---|---|---|---|---|---|
| Example 2 | −0.21 | −0.30 | 1.54 | −1.26 | −0.94 | 1.58 | −9.07 | 2.99 |
| Molded Aromatic Polyurethane | −17.27 | 11.36 | 46.14 | 47.31 | 4.36 | 50.56 | −142.35 | 93.80 |
| Molded SURLYN ® | −0.39 | −0.25 | 0.91 | −0.76 | −0.55 | 1.02 | −6.19 | 1.69 |

The test results for the molded balls after 48 hours of UV exposure are illustrated in Table 6.

TABLE 6

UV STABILITY DATA

| Sample | ΔL* | Δa* | Δb* | ΔC* | ΔH* | ΔE*ab | ΔW1 (E313) | ΔY1 (D1925) |
|---|---|---|---|---|---|---|---|---|
| Example 2 | −0.48 | −0.37 | 2.54 | −2.02 | −1.59 | 2.61 | −15.16 | 4.98 |
| Molded Aromatic Polyurethane | −23.46 | 15.01 | 42.75 | 45.18 | 3.44 | 51.02 | −127.75 | 98.96 |
| Molded SURLYN® | −0.54 | −0.39 | 1.43 | −1.18 | −0.91 | 1.58 | −9.50 | 2.66 |

The test results for the molded balls after 120 hours of UV exposure are illustrated in Table 7.

TABLE 7

UV STABILITY DATA

| Sample | ΔL* | Δa* | Δb* | ΔC* | ΔH* | ΔE*ab | ΔW1 (E313) | ΔY1 (D1925) |
|---|---|---|---|---|---|---|---|---|
| Example 2 | −0.92 | −0.46 | 5.87 | −3.01 | −5.06 | 5.96 | −33.72 | 11.68 |
| Molded Aromatic Polyurethane | −30.06 | 16.80 | 33.37 | 37.29 | 2.11 | 47.95 | −107.12 | 94.42 |
| Molded SURLYN® | −0.99 | −0.85 | 4.06 | −2.91 | −2.96 | 4.26 | −24.88 | 7.73 |

Example 3

$H_{12}$MDI Polyether Urethane Elastomer

A golf ball was made having the cover formulated from the composition in Table 8 including $H_{12}$MDI polyether urethane elastomer.

TABLE 8

$H_{12}$MDI POLYETHER URETHANE ELASTOMER COMPOSITION

| Chemical Components | Example 3 Weight (g) |
|---|---|
| $H_{12}$MDI/PTMEG Prepolymer, 9.1% NCO | 462.64 |
| 1,4-Butanediol | 26.02 |
| S28755PST3 Color Dispersion* | 31.25 |
| Dabco® T-12 Catalyst | 0.65 |

*S28755PST3 color dispersion is manufactured by PPG Industries.

The physical properties and the ball performance results are listed in Table 9. A control ball made with an aromatic polyurethane is also included in Table 9 for comparison purposes.

TABLE 9

PHYSICAL PROPERTIES

| | Ball Types | |
|---|---|---|
| Ball Properties | Aromatic Control | Example 3 |
| Nameplate Average | 1.684 | 1.683 |
| Equator Average | 1.685 | 1.683 |
| Weight Average, oz | 1.608 | 1.594 |
| Compression Average | 87 | 86 |
| Cover Hardness, Shore C | 81 | 79 |
| CoR @ 125 ft/sec | 0.810 | 0.809 |

TABLE 9-continued

PHYSICAL PROPERTIES

| | Ball Types | |
|---|---|---|
| Ball Properties | Aromatic Control | Example 3 |
| Impact Durability, 600 Hits | 1 failed @ 369 hits 1 failed @ 400 hits | no failure |
| Cold Crack Test, 5° F. | no failure | no failure |
| Light Stability 5 Days QUV Test | | |
| ΔY1 | | 1.6 |
| Δb* | | 0.8 |
| Live Golfer Shear Test* | | |
| Damage Rank | 3 | 2 |
| Appearance Rank | 3 | 2 |

*Rating of Shear Test: Based on a scale of 1-9, 1 is the best, 9 is the worst.

Example 4

$H_{12}$MDI Polycaprolactone Urethane Elastomer

A golf ball was made having the cover formulated from the composition in Table 10 including $H_{12}$MDI polycaprolactone urethane elastomer.

TABLE 10

$H_{12}$MDI POLYCAPROLACTONE URETHANE ELASTOMER COMPOSITION

| Chemical Components | Example 4 Weight (g) |
|---|---|
| $H_{12}$MDI/Polycaprolactone Prepolymer, 9.1% NCO | 462.64 |
| 1,4-Butanediol | 26.02 |
| S28755PST3 Color Dispersion* | 31.25 |

TABLE 10-continued $H_{12}$MDI POLYCAPROLACTONE
URETHANE ELASTOMER COMPOSITION

| Chemical Components | Example 4 Weight (g) |
|---|---|
| Tinuvin ® 292 HALS | 1.30 |
| Dabco ® T-12 Catalyst | 0.65 |

*S28755PST3 color dispersion is manufactured by PPG Industries.

The physical properties and the ball performance results are listed in Table 11. A control ball made with an aromatic polyurethane is also included in Table 11 for comparison purposes.

TABLE 11

PHYSICAL PROPERTIES

| | Ball Types | |
|---|---|---|
| Ball Properties | Aromatic Control | Example 4 |
| Nameplate Average | 1.678 | 1.683 |
| Equator Average | 1.680 | 1.683 |
| Weight Average, oz | 1.605 | 1.607 |
| Compression Average | 90 | 87 |
| Cover Hardness, Shore C | 82 | 83 |
| CoR @ 125 ft/sec | 0.811 | 0.808 |
| Impact Durability, 600 Hits | 1 failed @ 419, 488, 510, 512, 521 hits | 1 failed @ 535 hit |
| Cold Crack Test, 5° F. | no failure | no failure |
| Light Stability | 3 Hour QUV Test | 5 Days QUV Test |
| $\Delta Y1$ | 79.1 | 1.0 |
| $\Delta b^*$ | 40.8 | 0.5 |
| Live Golfer Shear Test* | | |
| Damage Rank | 1 | 7 |
| Appearance Rank | 1 | 7 |

*Rating of Shear Test: Based on a scale of 1-9, 1 is the best, 9 is the worst.

Example 5

$H_{12}$MDI Polyester Urethane Elastomer

A golf ball was made having the cover formulated from the composition in Table 12 including $H_{12}$MDI polyester urethane elastomer.

TABLE 12

$H_{12}$MDI POLYESTER URETHANE ELASTOMER COMPOSITION

| Chemical Components | Example 5 Weight (g) |
|---|---|
| $H_{12}$MDI/polyhexamethylene butylene adipate, 8.07% NCO | 521.69 |
| 1,4-Butanediol | 24.01 |
| S28755PST3 Color Dispersion* | 35.00 |
| Dabco ® T-12 Catalyst | 0.73 |

*S28755PST3 color dispersion is manufactured by PPG Industries.

The physical properties and the ball performance results are listed in Table 13. A control ball made with an aromatic polyurethane is also included in Table 13 for comparison purposes.

TABLE 13

PHYSICAL PROPERTIES

| | Ball Types | |
|---|---|---|
| Ball Properties | Aromatic Control | Example 5 |
| Nameplate Average | 1.684 | 1.683 |
| Equator Average | 1.683 | 1.680 |
| Weight Average, oz | 1.607 | 1.610 |
| Compression Average | 87 | 88 |
| Cover Hardness, Shore C | 81 | 84 |
| CoR @ 125 ft/sec | 0.806 | 0.803 |
| Impact Durability, 600 Hits | no failure | no failure |
| Cold Crack Test, 5° F. | no failure | no failure |
| Light Stability | 3 Hour QUV Test | 5 Days QUV Test |
| $\Delta Y1$ | 79.1 | 1.6 |
| $\Delta b^*$ | 40.8 | 0.8 |
| Live Golfer Shear Test* | | |
| Damage Rank | 1 | 3 |
| Appearance Rank | 1 | 2 |

*Rating of Shear Test: Based on a scale of 1-9, 1 is the best, 9 is the worst.

Example 6

$H_{12}$MDI Polyether Urethane/Urea Elastomer

A golf ball was made having the cover formulated from the composition in Table 14 including $H_{12}$MDI polyether urethane/urea elastomer.

TABLE 14

$H_{12}$MDI POLYETHER URETHANE/UREA ELASTOMER COMPOSITION

| Chemical Components | Example 6 Weight (g) |
|---|---|
| $H_{12}$MDI/PTMEG Prepolymer, 7.9% NCO | 532.91 |
| Clearlink 1000 | 152.95 |
| HCC-19584 Color Dispersion* | 24.88 |
| Dabco ® T-12 Catalyst | 0.07 |

*HCC-19584 color dispersion is manufactured by PolyOne Corporation.

The physical properties and the ball performance results are listed in Table 15. A control ball made with an aromatic polyurethane is also included in Table 15 for comparison purposes.

TABLE 15

PHYSICAL PROPERTIES

| | Ball Types | |
|---|---|---|
| Ball Properties | Aromatic Control | Example 6 |
| Nameplate Average | 1.683 | 1.687 |
| Equator Average | 1.683 | 1.682 |
| Weight Average, oz | 1.608 | 1.596 |
| Compression Average | 88 | 89 |
| Cover Hardness, Shore C | 81 | 86 |
| CoR @ 125 ft/sec | 0.805 | 0.806 |
| Impact Durability, 600 Hits | no failure | no failure |
| Cold Crack Test, 5° F. | no failure | no failure |
| Light Stability | 3 Hour QUV Test | 5 Days QUV Test |
| $\Delta Y1$ | 79.1 | 0.4 |
| $\Delta b^*$ | 40.8 | 0.1 |
| Live Golfer Shear Test* | | |
| Damage Rank | 1 | 1 |
| Appearance Rank | 1 | 1 |

*Rating of Shear Test: Based on a scale of 1-9, 1 is the best, 9 is the worst.

Example 7

Low Free HDI Polyether Urethane Elastomer Composition

A golf ball was made having the cover formulated from the composition in Table 16 including low free HDI polyether urethane elastomer.

TABLE 16

LOW FREE HDI POLYETHER URETHANE ELASTOMER COMPOSITION

| Chemical Components | Example 7 Weight (g) |
| --- | --- |
| HDI/PTMEG Prepolymer, 5.77% NCO | 729.64 |
| 1,4-Butanediol | 17.21 |
| S28755PST3 Color Dispersion* | 47.70 |
| Dabco ® T-12 Catalyst | 0.48 |

*S28755PST3 color dispersion is manufactured by PPG Industries.

The physical properties and the ball performance results are listed in Table 17. A control ball made with an aromatic polyurethane is also included in Table 17 for comparison purposes.

TABLE 17

PHYSICAL PROPERTIES

| | Ball Types | |
| --- | --- | --- |
| Ball Properties | Aromatic Control | Example 7 |
| Nameplate Average | 1.684 | 1.685 |
| Equator Average | 1.683 | 1.683 |
| Weight Average, oz | 1.607 | 1.602 |
| Compression Average | 89 | 89 |
| Cover Hardness, Shore C | 81 | 86 |
| CoR @ 125 ft/sec | 0.804 | 0.809 |
| Impact Durability, 600 Hits | 1 failed @ 550 hits | no failure |
| Cold Crack Test, 5° F. | no failure | no failure |
| Light Stability | 3 Hour QUV Test | 5 Days QUV Test |
| $\Delta Y1$ | 79.1 | 1.9 |
| $\Delta b^*$ | 40.8 | 0.8 |
| Live Golfer Shear Test* | | |
| Damage Rank | 1 | 3 |
| Appearance Rank | 1 | 3 |

*Rating of Shear Test: Based on a scale of 1-9, 1 is the best, 9 is the worst.

Example 8

$H_{12}$MDI/Dimerate Polyester Urethane Elastomer

A golf ball was made having the cover formulated from the composition in Table 18 including $H_{12}$MDI/dimerate polyester urethane elastomer.

TABLE 18

$H_{12}$MDI/DIMERATE POLYESTER URETHANE ELASTOMER COMPOSITION

| Chemical Components | Example 8 Weight (g) |
| --- | --- |
| $H_{12}$MDI/Hydroxy-Terminated Dimerate Polyester* Prepolymer, 9.10% NCO | 462.64 |
| 1,4-Butanediol | 26.02 |
| S28755PST3 Color Dispersion** | 31.25 |
| Dabco ® T-12 Catalyst | 0.65 |

*Hydroxy-terminated dimerate polyester polyol is manufactured by Uniqema.
**S28755PST3 color dispersion is manufactured by PPG Industries.

The physical properties and the ball performance results are listed in Table 19. A control ball made with an aromatic polyurethane is also included in Table 19 for comparison purposes.

TABLE 19

PHYSICAL PROPERTIES

| | Ball Types | |
| --- | --- | --- |
| Ball Properties | Aromatic Control | Example 8 |
| Nameplate Average | 1.684 | 1.689 |
| Equator Average | 1.683 | 1.683 |
| Weight Average, oz | 1.607 | 1.605 |
| Compression Average | 89 | 90 |
| Cover Hardness, Shore C | 82 | 84 |
| CoR @ 125 ft/sec | 0.807 | 0.807 |
| Impact Durability, 600 Hits | 1 failed @ 431, 524, 539, 578 hits | no failure |
| Cold Crack Test, 5° F. | no failure | no failure |
| Light Stability 5 Days QUV Test | | |
| $\Delta Y1$ | | 8.8 |
| $\Delta b^*$ | | 5.2 |
| Live Golfer Shear Test* | | |
| Damage Rank | 1 | 1 |
| Appearance Rank | 1 | 2 |

*Rating of Shear Test: Based on a scale of 1-9, 1 is the best, 9 is the worst.

Example 9

$H_{12}$MDI Polyether Urea Cured with Diol

A golf ball was made having the cover formulated from a composition including a prepolymer formed of $H_{12}$MDI and polyoxyalkylene, having a molecular weight of about 2000, cured with 1,4-butanediol. The physical properties and the ball performance results are listed in Table 20. A golf ball similar to Example 2, a light stable, aliphatic polyurethane, was used for comparison purposes.

TABLE 20

PHYSICAL PROPERTIES

| | Ball Types | |
| --- | --- | --- |
| Ball Properties | Aliphatic Polyurethane Control | Example 9 |
| Nameplate Average | 1.686 | 1.684 |
| Equator Average | 1.684 | 1.683 |
| Weight Average, oz | 1.599 | 1.595 |
| Compression Average | 86 | 86 |
| CoR @ 125 ft/sec | 0.807 | 0.805 |
| Cold Crack Test, 5° F. | no failure | no failure |

TABLE 20-continued

PHYSICAL PROPERTIES

| Ball Properties | Ball Types Aliphatic Polyurethane Control | Example 9 |
|---|---|---|
| Light Stability (5 Days QUV Test) | | |
| ΔY1 | 3.2 | 0.8 |
| Δb* | 1.7 | 0.4 |
| Live Golfer Shear Test* | | |
| Damage Rank | 3 | 2 |
| Appearance Rank | 3 | 2 |

*Rating of Shear Test: Based on a scale of 1-9, 1 is the best, 9 is the worst.

Example 10

$H_{12}$MDI Polyether Urea Cured with a Diamine

A golf ball was made having the cover formulated from a composition including a prepolymer formed of $H_{12}$MDI and polyoxyalkylene, having a molecular weight of about 2000, cured with 4,4'-bis-(sec-butylamino)-dicyclohexylmethane (Clearlink 1000). The physical properties and the ball performance results are listed in Table 21. A golf ball similar to Example 2, a light stable, aliphatic polyurethane, was used for comparison purposes.

TABLE 21

PHYSICAL PROPERTIES

| Ball Properties | Ball Types Light Stable Polyurethane Control | Example 10 |
|---|---|---|
| Nameplate Average | 1.683 | 1.686 |
| Equator Average | 1.681 | 1.684 |
| Weight Average, oz | 1.597 | 1.600 |
| Compression Average | 89 | 92 |
| CoR @ 125 ft/sec | 0.807 | 0.815 |
| Cold Crack Test, 5° F. | no failure | no failure |
| Light Stability (5 Days QUV Test) | | |
| ΔY1 | 4.3 | 0.6 |
| Δb* | 2.4 | 0.3 |

TABLE 21-continued

PHYSICAL PROPERTIES

| Ball Properties | Ball Types Light Stable Polyurethane Control | Example 10 |
|---|---|---|
| Live Golfer Shear Test* | | |
| Damage Rank | 3 | 1 |
| Appearance Rank | 3 | 1 |

*Rating of Shear Test: Based on a scale of 1-9, 1 is the best, 9 is the worst.

Examples 11-15

Modified Curative Blends

A pigment dispersion concentrate was prepared using components as outlined in Table 22. A Cowles blade was used to achieve a pigment dispersion of 6.0 on the Hegman scale.

TABLE 22

PIGMENT DISPERSION

| Material | Weight Percent (of total dispersion) |
|---|---|
| 1,4-Butanediol[1] | 69.44% |
| $TiO_2$[2] | 23.42% |
| Ultramarine Blue Pigment[3] | 0.23% |
| SILWET L-7210 wetting additive[4] | 0.10% |
| Tinuvin 292[5] | 2.13% |
| Tin Catalyst[6] | 4.68% |

[1]Obtained from Lyondel Corporation
[2]Obtained from Dupont Corporation
[3]Obtained from Whittaker, Clark, and Daniels
[4]Polyalkeneoxide modified polydimethylsiloxane, obtained from Crompton Corporation
[5]Hindered Amine Light Stabilizer, obtained from Ciba-Geigy
[6]Tin catalyst, obtained from Air Products.

The pigment dispersion concentrate was then blended with a curing agent and a freezing point depressing agent (with the exception of control Example 11) to make a curative blend. The freezing point of the curative blend was determined by cooling the material in an ice bath and recording the solidification temperature. As shown in Table 23, the addition of a freezing point depressing agent (Examples 12-15) lowered the freezing point of the blend by at least about 14° F. as compared to the pigment dispersion without a freezing point depressing agent. Example 12 demonstrates the use of ethylene glycol as a freezing point depressing agent, which lowered the freezing point of the pigment dispersion by about 19° F.

TABLE 23

PHYSICAL PROPERTIES

| Weight Percent of Total Curative Blend | Example 11 (Control) | Example 12 | Example 13 | Example 14 | Example 15 |
|---|---|---|---|---|---|
| Pigment Disperson | 100% | 90% | 90% | 90% | 90% |
| Ethylene Glycol | — | 10% | — | — | — |
| Dipropylene Glycol | — | — | 10% | — | — |
| Propylene Glycol | — | — | — | 10% | — |
| 2-methyl-1,3-propanendiol | — | — | — | — | 10% |
| Freezing Point | 64° F. | 45° F. | 50° F. | 50° F. | 50° F. |

In addition, the curative blend of Example 15 exhibited a soft semi-solid upon freezing as compared to the crystallized solid formed in the control (Example 11).

Examples 16-20

Modified Curative Blends

A titanium white pigment dispersion was prepared according to the invention as outlined in Table 24. A Cowles blade was used to achieve a pigment dispersion of 6.0 on the Hegman scale.

TABLE 24

PIGMENT DISPERSION

| Material | Weight Percent (of total dispersion) |
|---|---|
| 1,4-Butanediol[1] | 53.78% |
| TiO$_2$[2] | 46.02% |
| SILWET L-7210 wetting additive[3] | 0.20% |

[1]Obtained from Lyondel Corporation
[2]Obtained from Dupont Corporation
[3]Polyalkeneoxide modified polydimethylsiloxane, obtained from Crompton Corporation The pigment dispersion was then blended with a curing agent, a freezing point depressing agent (with the exception of the control Example 16), and a tin catalyst for faster reaction to make a curative blend. The freezing point of the curative blend was determined by cooling the material in an ice bath and recording the solidification temperature. As shown in Table 25, the addition of a sufficient amount of freezing point depressing agent (Examples 18-20) lowered the freezing point of the blend by at least about 8° F. as compared to the pigment dispersion without a freezing point depressing agent. In addition, the curative blend of Examples 18 and 19 exhibited a soft semi-solid upon freezing as compared to the crystallized solid formed in the control (Example 16).

TABLE 25

PHYSICAL PROPERTIES

| Weight Percent of Total Curative Blend | Example 16 (Control) | Example 17 | Example 18 | Example 19 | Example 20 |
|---|---|---|---|---|---|
| Pigment Disperson | 57.3% | 57.3% | 57.3% | 57.3% | 57.3% |
| 1,4-butanediol | 37.5% | 36.8% | 34.1% | 30.7% | 23.8% |
| 2-methyl-1,3-propanendiol | 0 | 0.7% | 3.4% | 6.8% | 13.6% |
| Tin Catalyst | 5.3% | 5.3% | 5.3% | 5.3% | 5.3% |
| Freezing Point | 66° F. | 66° F. | 58° F. | 53° F. | 42° F. |

The curative blends of Examples 16-20 were placed in a freezer for 72 hours with temperatures ranging from about −14° F. to about 14° F. The blends were then thawed at room temperature. Table 26 shows the pigment dispersion (as measured on the Hegman scale) of each blend after thawing. Examples 19 and 20 demonstrated good pigment dispersion after a freeze/thaw cycle, which allows reuse without having to agitate at a high speed or mill grind.

TABLE 26

PIGMENT DISPERSION OF BLENDS AFTER THAWING

| | Hegman Scale | |
|---|---|---|
| Example # | Before Freezing | After Freezing |
| Example 16 (Control) | 6.0 | 0 large agglomerates |
| Example 17 | 6.0 | 0 large agglomerates |
| Example 18 | 6.0 | 0 less agglomerates |
| Example 19 | 6.0 | 4.0 very smooth, homogenous |
| Example 20 | 6.0 | 5.0 very smooth, homogenous |

Examples 21-25

Modified Curative Blends

An organic red pigment dispersion was prepared according to the invention as outlined in Table 27. A Cowles blade was used to achieve a pigment dispersion of 5.0 on the Hegman scale.

TABLE 27

PIGMENT DISPERSION

| Material | Weight Percent (of total dispersion) |
|---|---|
| 1,4-Butanediol[1] | 78.26% |
| Novoperm Red Pigment[1] | 21.60% |
| SILWET L-7210 wetting additive[3] | 0.14% |

[1]Obtained from Lyondel Corporation
[2]Obtained from Clariant Corporation
[3]Polyalkeneoxide modified polydimethylsiloxane, obtained from Crompton Corporation The pigment dispersion was then blended with a curing agent and a freezing point depressing agent (with the exception of the control Example 21) to make a curative blend. The freezing point of the curative blend was determined by cooling the material in an ice bath and recording the solidification temperature. As shown in Table 28, the addition of a sufficient amount of freezing point depressing agent (Examples 23-25) lowered the freezing point of the blend by at least about 8° F. as compared to the pigment dispersion without a freezing point depressing agent. In addition, the curative blend of Examples 18 and 19 exhibited a soft semi-solid upon freezing as compared to the crystallized solid formed in the control (Example 21).

TABLE 28

PHYSICAL PROPERTIES

| Weight Percent of Total Curative Blend | Example 21 (Control) | Example 22 | Example 23 | Example 24 | Example 25 |
|---|---|---|---|---|---|
| Pigment Disperson | 66.7% | 66.7% | 66.7% | 66.7% | 66.7% |
| 1,4-butanediol | 33.3% | 32.5% | 29.1% | 24.8% | 16.2% |
| 2-methyl-1,3-propanendiol | 0 | 0.8% | 4.2% | 8.5% | 17.1% |
| Freezing Point | 66° F. | 66° F. | 58° F. | 53° F. | 42° F. |

The curative blends of Examples 21-25 were placed in a freezer for 72 hours with temperatures ranging from about −14° F. to about 14° F. The blends were then thawed at room temperature. Table 29 shows the pigment dispersion (as measured on the Hegman scale) of each blend after thawing. Examples 24 and 25 demonstrated good pigment dispersion after a freeze/thaw cycle, which allows reuse without having to agitate at a high speed or mill grind.

TABLE 29

PIGMENT DISPERSION OF BLENDS AFTER THAWING

| | Hegman Scale | |
|---|---|---|
| Example # | Before Freezing | After Freezing |
| Example 21 (Control) | 5.0 | 0<br>large agglomerates |
| Example 22 | 5.0 | 0<br>large agglomerates |
| Example 23 | 5.0 | 0<br>less agglomerates |
| Example 24 | 5.0 | 4.0<br>very smooth, homogenous |
| Example 25 | 5.0 | 5.0<br>very smooth, homogenous |

Example 26

Golf Ball Cover with Modified Curative Blend

Curative blend samples were prepared with 90 parts by weight 1,4-butanediol and 10 parts by weight of freezing point depressing agent 2-methyl-1,3-propanediol. After overnight refrigeration, the samples remained in liquid form. The curative blend began to solidify at about 40° F. Upon thawing at room temperature, the samples had a pigment dispersion of about 6.0 or greater on the Hegman scale. In addition, comparison of the samples with control 1,4-butanediol curing agents containing no freezing point depressing agents showed that the samples had a noticeable improvement for setting and separation.

Samples were frozen and shipped overnight for golf ball formulation. Covers were formed onto inner components using an $H_{12}$MDI/PTMEG 2000 prepolymer (9.1 percent NCO content) cured with the sample curative blend. Control balls were created with a cover formed onto the same inner components as Example 26, but the cover included an $H_{12}$MDI/PTMEG 2000 prepolymer (9.1 percent NCO content) cured with an unmodified 1,4-butanediol curing agent. Table 30 demonstrates that the addition of the freezing point depressing agent in the curative blend (Example 26) does not result in the degradation of ball performance or weakening of physical properties as the results for both the control and Example 26 are substantially the same.

TABLE 30

PHYSICAL PROPERTIES

| | Ball Types | |
|---|---|---|
| Ball Properties | Control | Example 26 |
| Nameplate Average | 1.682 | 1.682 |
| Equator Average | 1.680 | 1.680 |
| Weight Average, oz | 1.593 | 1.593 |
| Compression Average | 87 | 86 |
| CoR @ 125 ft/sec | 0.805 | 0.804 |
| Impact Durability Test, 600 Hits | no failure | no failure |
| Cold Crack Test, 5° F. | no failure | no failure |

All patents and patent applications cited in the foregoing text are expressly incorporate herein by reference in their entirety. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method of forming a golf ball comprising the steps of:
providing a core;
providing a layer disposed about the core;
providing a curative blend formed from a saturated curing agent, a compatible saturated freezing point depressing agent, and a grind vehicle comprising a pigment, wherein the saturated curing agent has a first freezing point and the curative blend has a second freezing point less than the first freezing point;
forming a composition comprising:
a prepolymer formed from the reaction product of a saturated isocyanate and a saturated polyol or saturated polyamine; and
the curative blend; and
disposing a cover formed from the composition about the layer.

2. The method of claim 1, wherein the step of providing a layer comprises providing a layer comprising ionomer.

3. The method of claim 1, wherein the second freezing point is less than the first freezing point by about 5° F. or greater.

4. The method of claim 3, wherein the second freezing point is less than the first freezing point by about 10° F. or greater.

5. The method of claim 1, wherein the step of providing a curative blend comprises selecting a freezing point depressing agent having a freezing point from about −10° F. to about −100° F.

6. The method of claim 1, wherein the step of providing a curative blend comprises selecting a freezing point depressing agent comprising hydroxy-terminated freezing point depressing agents selected from the group consisting of 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, or mixtures there of.

7. The method of claim 1, wherein the freezing point depressing agent has a freezing point of about 10° F. or less.

8. A method of forming a golf ball comprising:
providing a core;
providing an intermediate later comprising a thermoplastic material;
forming a composition comprising:
a saturated prepolymer formed from the reaction product of a saturated isocyanate and a saturated polyol, saturated polyamine, or a mixture thereof; and
a curative blend formed from a saturated curing agent, a compatible saturated freezing point depressing agent present in an amount of about 8 percent or greater by weight of the curative blend, and a pigment, wherein the pigment is dispersed in a grind vehicle; and
forming a cover from the composition disposed about the intermediate layer.

9. The method of claim 8, wherein the saturated freezing point depressing agent has a freezing point of about −10° F. to about −120° F.

10. The method of claim 8, wherein the saturated curing agent has a first freezing point and the curative blend has a second freezing point that is less than the first freezing point by about 5° F. or greater.

11. The method of claim 10, wherein the saturated curing agent has a first freezing point and the curative blend has a second freezing point that is less than the first freezing point by about 10° F. or greater.

12. The method of claim 8, wherein the saturated freezing point depressing agent is present in an amount of about 10 percent or greater by weight of the curative blend.

13. A method of forming a golf ball comprising the steps of:
   providing a core;
   providing a layer disposed about the core;
   providing a curative blend formed from a curing agent, a compatible freezing point depressing agent, and a pigment dispersed in a grind vehicle;
   forming a composition comprising:
      a prepolymer formed from the reaction product of a isocyanate and a polyol or polyamine; and
      the curative blend; and
   forming a cover from the composition about the layer, wherein the cover has a thickness of from about 0.02 inches to about 0.035 inches.

14. The method of claim 13, wherein the curative blend has a freezing point of about −30° F. to about −70° F.

15. The method of claim 13, wherein the step of providing a curative blend comprises selecting a freezing point depressing agent from the group consisting of 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, and mixtures thereof.

16. The method of claim 13, wherein the step of providing a curative blend comprises selecting a freezing point depressing agent having a freezing point from about −10° F. to about −100° F.

17. The method of claim 13, wherein the curing agent has a first freezing point and the curative blend has a second freezing point that is less than the first freezing point by about 5° F. or greater.

18. The method of claim 17, wherein the second freezing point is less than the first freezing point by about 10° F. or greater.

19. The method of claim 13, wherein the step of providing a layer comprises providing a layer comprising a thermoplastic material.

* * * * *

UNITED STATES PATENT AND TRADEMARK OFFICE
CERTIFICATE OF CORRECTION

| | | |
|---|---|---|
| PATENT NO. | : 8,227,565 B2 | Page 1 of 1 |
| APPLICATION NO. | : 13/026743 | |
| DATED | : July 24, 2012 | |
| INVENTOR(S) | : Shenshen Wu et al. | |

It is certified that error appears in the above-identified patent and that said Letters Patent is hereby corrected as shown below:

On the title page under "Related U.S. Application Data", the data should be corrected to reflect as follows:

Item (60) This application is a continuation of application No. 12/689,698, filed on Jan. 19, 2010, now Pat. No. 7,888,449, which is a continuation of application No. 11/429,055, filed on May 8, 2006, now Pat. No. 7,649,072, which is a division of application No. 10/339,603, filed on Jan. 10, 2003, now Pat. No. 7,041,769, which is a continuation-in-part of application No. 10/194,057, filed on Jul. 15, 2002, now Pat. No. 6,867,279, which is a continuation-in-part of application No. 09/466,434, filed on Dec. 17, 1999, now Pat. No. 6,476,176.

Signed and Sealed this
Eighteenth Day of September, 2012

David J. Kappos
*Director of the United States Patent and Trademark Office*